(12) United States Patent
Ueda et al.

(10) Patent No.: US 6,250,812 B1
(45) Date of Patent: Jun. 26, 2001

(54) ROLLING BEARING

(75) Inventors: Kouji Ueda; Manabu Ohori, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/108,391

(22) Filed: Jul. 1, 1998

(30) Foreign Application Priority Data

Jul. 1, 1997 (JP) .................................... 9-188898
Dec. 2, 1997 (JP) .................................... 9-345718
Apr. 3, 1998 (JP) .................................... 10-107102

(51) Int. Cl.$^7$ .................................... F16C 19/06

(52) U.S. Cl. .................... 384/492; 384/912; 384/609

(58) Field of Search ................... 384/492, 565, 384/569, 912, 609

(56) References Cited

U.S. PATENT DOCUMENTS 5,086,560 * 2/1992 Glazier ................................. 384/548
5,518,820 * 5/1996 Averbach et al. ................... 384/492

* cited by examiner

Primary Examiner—Lenard A. Footland
(74) Attorney, Agent, or Firm—Crowell & Moring, L.L.P.

(57) ABSTRACT

The present invention provides a rolling bearing having an excellent corrosion resistance and toughness which can fairly operate at a high rotary speed. At least the inner race is formed by a titanium alloy, and the rolling elements are formed by ceramics. Alternatively, at least one of the inner race and the outer race is formed by a β type titanium alloy. The percent cold working of the β type titanium alloy is predetermined to not less than 20% or a range of from 5 to 20%. The cold working is followed by shot peening. Further, the surface hardness Hv is predetermined to not less than 600. The volumetric ratio of residual β phase in the β type titanium alloy is predetermined to a range of from 30 to 80%.

4 Claims, 6 Drawing Sheets

ROLLING BEARING

FIELD OF THE INVENTION

The present invention relates to a rolling bearing, and, more particularly, a rolling bearing which is used which is used under a special environment, for example, under an environment requiring corrosion resistance to water content, sea water and chemicals, e.g., in a food machine, a semiconductor producing apparatus and a chemical fiber producing machine, or in a tool machine which operates at a high rotary speed.

BACKGROUND OF THE INVENTION

As a bearing which must be corrosion-resistant there has been heretofore used relatively often a sliding bearing made of a material having an excellent corrosion resistance. In recent years, rolling bearings have been used more and more from the standpoint of torque reduction that prevents dynamic loss or eliminates the necessity of maintenance and improvement of product quality.

As the material for such rolling bearings there is mostly used a low-alloy steel such as two kinds of high carbon chromium bearing steels (SUJ2) and case hardening steel (SCR420). However, rolling bearings are used in various working conditions. Thus, if such a rolling bearing made of a low-alloy steel is used under environmental conditions which can be contaminated by water content or sea water, the contamination by even a slight amount of water content or sea water corrodes the bearing portion thereof corrodes with rust that disables the rolling bearing from working. Thus, martensite stainless steel having an excellent corrosion resistance and a high chromium content (e.g., SUS440C) is used under such environmental conditions.

However, a rolling bearing comprising races and rolling elements both of which are made of martensite-based stainless steel (hereinafter simply referred to as "stainless steel") can exhibit an insufficient corrosion resistance in some working atmospheres. In this case, corrosion occurs with chromium-deficient layer in the vicinity of coarse eutectic carbide as a starting point to reduce precision such as surface smoothness, possibly making it impossible to secure the desired bearing life. In particular, a rolling bearing adapted for use in semiconductor producing apparatus, etc. is subject to attack by a corrosive gas or chemical that can corrode stainless steel. Thus, it is required that such a rolling bearing comprise a material having a better corrosion resistance than stainless steel.

From this standpoint of view, as a bearing material constituting a rolling bearing adapted for use in corrosive working atmospheres there has heretofore been used a ceramic material such as silicon nitride ($Si_3N_4$) (hereinafter referred to as "first conventional technique").

In the machine tool industry, on the other hand, the recent trend is for more machines to operate at higher rotary speed. To this end, it is required for the rolling bearing for supporting the rotary portion of machine tools to have higher precision and withstand severer working conditions. When a machine tool operates at a raised rotary speed, the so-called bearing clearance is reduced, causing further rolling friction that adds to heat generation. As a result, the temperature of the bearing rises.

The rise in the heat generation due to rolling friction is considered to be attributed to the rise in the centrifugal force applied to the rolling elements. In order to lessen the centrifugal force and hence lower the temperature of the rolling elements, a rolling bearing comprising rolling elements made of ceramic material, which exhibit a small density (specific gravity), rather than low-alloy steel has heretofore been put into practical use. However, with the recent trend for more machine tools to operate at even higher rotary speed, mere reduction of the weight of the rolling elements cannot prevent the rise in the bearing temperature.

By the way, the heat generated in the outer race during high speed rotation normally is radiated to the exterior through the housing. Since the heat generated in the inner race can be difficultly radiated from the rotary axis, the temperature of the inner race is higher than that of the outer race. Thus, if the outer race and the inner race are formed by the same material, and the temperature of the inner race is raised by heat generation, the inner race undergoes a great thermal expansion that reduces the bearing clearance from the initial value. The resulting preload is excessive, accelerating the heat generation. This phenomenon occurs in a vicious circle. Eventually, the bearing undergoes seizing that can lead to the destruction of the bearing.

From this standpoint of view, a rolling bearing has been proposed comprising an inner race formed by a material having a smaller linear expansion coefficient than the outer race material (see JP-B-7-30788 (The term "JP-B" as used herein means an "examined Japanese patent publication")) (hereinafter referred to as "second conventional technique"). In accordance with the foregoing second conventional technique, the inner race is formed by a material having a smaller linear expansion coefficient than the outer race material. For example, the outer race may be formed by a high carbon chromium bearing steel (SUJ2) while the inner race may be formed by a stainless steel (SUS440C) or ceramic material. In this arrangement, even if the temperature of the inner race is higher than that of the outer race, the expansion of the inner race caused by the temperature difference between the inner race and the outer race can be inhibited. As a result, the variation of preload accompanying the change in the bearing clearance is reduced, making it possible to prevent the bearing from seizing.

A titanium alloy has a lighter weight and a higher strength than a steel material and a very excellent corrosion resistance among metallic materials and thus is expected to be a bearing material for use in special corrosive atmospheres such as those contaminated by water content, sea water, chemical, etc.

In a rolling bearing, however, a very great face pressure is applied to the portion at which the races and the rolling elements come in contact with each other. Thus, it is required for a rolling bearing to exhibit a high surface hardness. However, a titanium alloy which has been merely subjected to ordinary heat treatment such as solution treatment and aging cannot be provided with a desired surface hardness.

From this standpoint of view, a technique for enhancing the surface hardness of a titanium alloy by a predetermined surface treatment has been proposed (JP-B-61-2747) (hereinafter referred to as "third conventional technique").

In the foregoing third conventional technique, a titanium alloy is subjected to gaseous nitriding or carburizing so that penetrating elements such as C, N and O are diffused in the form of solid solution therein, thereby securing the surface hardness required for the races.

In the foregoing first conventional technique, a ceramic material is used as bearing material. Thus, the bearing exhibits an extremely good corrosion resistance as compared with stainless steel. However, the first conventional technique is disadvantageous in that a ceramic material is inferior to stainless steel in strength or toughness and thus cannot be used without any trouble in atmospheres subject to great load. In particular, the use of ceramic material as the race material is undesirable from the standpoint of reliability of bearing.

Further, a ceramic material is remarkably inferior to metallic material in formability and grindability. Thus, if all the essential parts of a bearing are formed by a ceramic material, it disadvantageously adds to the production cost.

Moreover, a ceramic material has an extremely smaller linear expansion coefficient than a metallic material. Thus, the foregoing conventional technique has some disadvantages. For example, if the outer race is formed by the foregoing high carbon chromium steel (SUJ2) and the inner race is formed by a ceramic material, the difference in thermal expansion between the metallic rotary axis and the inner race made of ceramic material becomes too great when the temperature rises to relax the thermal expansion of the rotary axis, possibly cracking the inner race made of ceramic material and hence causing the destruction of the bearing.

On the other hand, if the outer race is formed by a high carbon chromium bearing steel (SUJ2) and the inner race is formed by a stainless steel (SUS440C), the change in the bearing clearance caused by the temperature rise can be minimized because the linear expansion coefficient of stainless steel is as small as 80% of that of high carbon chromium bearing steel. Further, since a stainless steel is a metallic material, the inner race made of stainless steel is considered to be insusceptible to cracking due to the difference in thermal expansion between the rotary axis and the inner race unlike the inner race made of ceramic material.

However, since the stainless steel used as inner race material has a higher density (higher specific gravity) than the ceramic material, the rise in the centrifugal force applied to the inner race cannot be neglected. In other words, since centrifugal force increases in proportion to mass and speed, the inner race expands due to the centrifugal force produced by rotation as the rotary speed increases. As a result, the bearing clearance is reduced, accelerating the heat generation.

The foregoing third conventional technique is disadvantageous in that the resulting surface hardness and depth of hardening differ greatly with the kind of penetrating elements to be incorporated in the form of solid solution by surface treatment. Further, some titanium alloys used have too low a strength in the core to fulfill a sufficient function as bearing.

In accordance with the third conventional technique, the surface hardness of the titanium alloy can be enhanced by diffusing penetrating elements in the titanium alloy in the form of solid solution. However, these penetrating elements can embrittle the titanium alloy, making it impossible to obtain a desired bearing life.

SUMMARY OF THE INVENTION

It is therefore an object of the present invention to provide a rolling bearing excellent in corrosion resistance, toughness and high rotary speed operation.

The foregoing and other objects of the present invention will become more apparent from the following detailed description and examples.

The objects are achieved by the following embodiments mainly.

(1) A rolling bearing comprising races composed of an outer race and an inner race and rolling elements which are provided between the outer race and the inner race such that the rolling elements rotate freely, wherein at least the inner race is made of a titanium alloy and the rolling elements are made of a corrosion-resistant material.

(2) The rolling bearing of item (1), wherein the titanium alloy is selected from the group consisting of $\beta$ type titanium alloy and ($\alpha+\beta$) type titanium alloy and the corrosion-resistant material is selected from the group consisting of ceramics and martensite stainless steel.

(3) The rolling bearing of item (1), wherein the surface hardness (Hv) of the finished raceway track on at least one race selected from the group consisting of the outer race and the inner race is not less than 600.

(4) The rolling bearing of item (1), wherein the surface of the finished raceway track on the at least one race comprises a mixture of a phase texture and $\beta$ phase texture, the proportion of the $\beta$ phase in the mixture being from 30 to 80 vol %.

(5) A method for producing a rolling bearing, which comprises preparing at least one race selected from the group consisting of an outer race and an inner race according to a method which comprises steps of:
(a) selecting at least one from the group consisting of $\beta$ type titanium alloy and ($\alpha+\beta$) type titanium alloy as a race material;
(b) heating and keeping said race material at the temperature falling within the range of $\beta$ phase temperature of not lower than $\beta$ phase transition point ($\beta$-phase transus) to effect solution treatment such that the phase of the texture of said race material is converted to $\beta$ phase;
(c) rapidly cooling said race material so that the texture of said race material normally stays in $\beta$ single phase;
(d) subjecting said race material to plastic working (cold working) so that it is shaped as desired and given work strain, which enables formation of nuclei of $\alpha$ phase which is harder than $\beta$ phase and the $\alpha$ phase to be finely deposited in $\beta$ phase;
(e) subjecting said race material to aging at a predetermined temperature lower than $\beta$ phase transition point, whereby nuclei of $\alpha$ phase are formed and grown and the $\alpha$ phase is finely deposited in $\beta$ phase; and then
(f) machining said race material to a race.

(6) The method of item (5), wherein the percent plastic working at the step (d) is not less than 20%.

(7) The method of item (5), wherein the percent plastic working is from 5 to 30% and the surface of the raceway track is subjected to shot peening before aging.

(8) The method of item (7), wherein shot peening is effected after aging.

BRIEF DESCRIPTION OF THE DRAWINGS

By way of example and to make the description more clear, reference is made to the accompanying drawings in which.

DETAILED DESCRIPTION OF THE INVENTION

Figure 1:
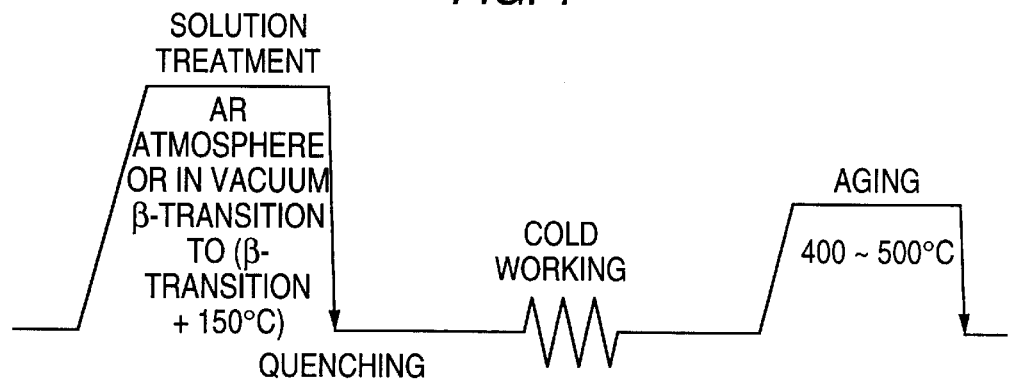
FIG. 1 is a chart illustrating a second embodiment of the method for the production of the bearing material according to the embodiment of the present invention.

The present invention will be further described hereinafter.

The inventors made extensive studies of rolling bearing having an excellent corrosion resistance. As a result, it was found that the use of a titanium alloy having a higher toughness than ceramics as a race material makes it possible to drastically improve corrosion resistance as compared with the use of stainless steel.

It was also found that an inner race formed by such a titanium alloy, which has a lighter weight and a smaller linear expansion coefficient than stainless steel, shows a smaller temperature rise during high speed operation than that formed by stainless steel, making it possible to avoid the reduction of clearance and hence inhibit the rise in heat generation.

The present invention has been worked out on the basis of these knowledges. As the first feature, the rolling bearing according to the present invention comprises an outer race and an inner race and rolling elements rotatably provided between the outer race and the inner race, wherein at least the inner race is made of a titanium alloy and the rolling elements are made of a corrosion-resistant material.

The inventors obtained a knowledge that among titanium alloys having an excellent corrosion resistance a β type titanium alloy exhibits a high strength and an excellent cold-workability in the form of solid solution and then made extensive studies. As a result, it was found that the use of a β type titanium alloy cold-worked at a percent cold working (percent plastic working) of not less than 20% as a bearing material makes it possible to provide a race having a Rockwell hardness HRC (hereinafter simply referred as "HRC") of not less than 57 through a short aging.

Thus, as the second feature, in the rolling bearing according to the present invention, at least one of the inner race and outer race is formed by a β type titanium alloy cold-worked at a percent cold working of not less than 20%.

When a titanium alloy which has been cold-worked by not less than 20% is subjected to aging, a rolling bearing having a desired surface hardness as defined above can be obtained. However, the resulting β type titanium alloy tends to have a hardened texture as a whole. In particular, if the percent cold working is predetermined high, the β type titanium alloy hardens more than necessary even in its core and to thereby exhibit a reduced toughness. Accordingly, from the point of view of obtaining good toughness, it appears to be preferred that the titanium alloy be not subjected to cold working or, if any, be subjected to cold working at a low percent working to obtain a good toughness.

If a steel material such as stainless steel is used as a race material, it is subjected to heat treatment such as hardening and tempering and then to shot peening to have an enhanced surface hardness. In other words, when subjected to shot peening, the stainless steel material undergoes transformation of residual austenite to martensite, producing stress that gives a huge strain energy to the surface layer of the race. The work-hardening makes it possible to enhance the surface hardness of the race.

However, the inventors' studies made it obvious that if a titanium alloy which has been subjected to heat treatment is subjected to shot peening alone, the amount and depth of work strain thus provided are restricted, making it difficult to obtain a desired surface hardness required for rolling bearing.

Paying their attention to the rise in surface hardness by shot peening, the inventors made further extensive studies. As a result, it was found that a titanium alloy which has been cold-worked at a percent working of from 5 to 20% can be subjected to shot peening to obtain a rolling bearing having a good toughness as well as a high surface hardness.

As the other feature, in the rolling bearing according to the present invention, at least one of the inner race and outer race is formed by a β type titanium alloy obtained by cold working at a percent working of from 5 to 20%, followed by shot peening.

In the foregoing aspect of the present invention, if a titanium alloy which has been cold-worked is subjected to shot peening followed by aging, a rolling bearing having a Vickers surface hardness Hv (hereinafter simply referred to as "Hv") of not less than 600 (corresponding to HRC of about 57) can be obtained. In order to improve fatigue resistance, the titanium alloy which has been aged is preferably again subjected to shot peening.

During their study of the life of a race made of a titanium alloy, the inventors found that the bearing shows a shorter life when the lubricant is contaminated by foreign matters than when the lubricant is free of foreign matters similarly to the case where the race is made of a steel material such as stainless steel.

For the conventional rolling bearings made of steel material, a technique for improving the life of bearing by optimizing the carbon content and residual austenite, optionally carbon nitride content, in the surface layer of the bearing is proposed in JP-B-7-88851. In the known technique, by optimizing and restricting the content of carbon, residual austenite and carbon nitride in the material to a specific range, the concentration of stress on the edge portion of impression produced by foreign matters can be relaxed, inhibiting the generation of cracks. As a result, the life of the bearing can be improved.

The optimum relationship between the amount of residual austenite and the surface hardness is found by adjusting and optimizing the average grain diameter of carbide or carbon nitride and a technique for prolonging the life of bearing based on the relationship is proposed in JP-B-8-26446.

In other words, the foregoing known techniques (JP-B-788851, JP-B-8-26446) contemplate optimizing the amount of soft austenite to improve the life of bearing when the lubricant is contaminated by foreign matters. Accordingly, it is considered that even a β type titanium alloy can provide a bearing which can operate over a prolonged life even when the lubricant is contaminated by foreign matters if the volumetric proportion of residual β phase being a soft phase is optimized.

The inventors made extensive studies from such a standpoint of view. As a result, it was found that if the volumetric proportion of residual β phase in soft phase in the texture of β type titanium alloy is optimized, a bearing can be obtained which can operate over a desired life even when the lubricant is contaminated by foreign matters.

As the fourth feature, in the rolling bearing according to the present invention, at least one of the inner race and outer race is formed by a β type titanium alloy obtained by cold working at a percent working of not less than 20%, and the volumetric proportion of residual β phase in the β type titanium alloy is from 30 to 80%.

In the foregoing aspect of the present invention, if the percent cold working is predetermined to 5 to 20% on condition that a titanium alloy which has been cold-worked is subjected to shot peening, a rolling bearing which satisfies both the two requirements for toughness and surface hardness can be obtained.

FIRST EMBODIMENT

In the rolling bearing according to the first embodiment of the present invention, at least the inner race is formed by a titanium alloy, and the rolling elements are formed by a corrosion-resistant material such as ceramics.

The reason why the rolling bearing and the rolling elements are formed by these materials will be described hereinafter.

(1) Races

The terminology "a race" as used hereinafter inclusively means an inner race and an outer race.

A race formed by a titanium alloy exhibits a drastically improved corrosion resistance as compared with that formed by stainless steel.

The corrosion resistance of titanium is attributed to the formation of a stable passive film on the surface thereof similarly to stainless steel. The passive film of titanium is known to be $TiO_2$ (or $Ti_2O_3$) (see Goro Ito, "Fushoku kagaku to boshoku gijutsu (Corrosion science and corrosion prevention technique)", revised edition, page 282, Corona Co., Ltd., 1979). Thus, the excellent corrosion resistance of titanium is attributed to properties inherent to the passive film of titanium.

In other words, $TiO_2$, which is the passive film of titanium, exhibits a high oxygen overvoltage. As the potential applied to titanium rises, the animation proceeds. The resulting passive film exhibits an excellent corrosion resistance even in a high temperature high concentration oxidizing atmosphere such as high temperature high concentration nitric acid. Unlike stainless steel, titanium does not undergo corrosion due to overpassivation.

On the other hand, $TiO_2$ corrodes in a nonoxidizing atmosphere such as hydrochloric acid and sulfuric acid easily but less easily than stainless steel. Further, $TiO_2$ requires a low passivation potential for forming a passive film. Therefore, a titanium alloy can be easily passivated merely by dipping it in a corrosive solution comprising an extremely small amount of an oxidizing agent incorporated therein. Accordingly, a titanium alloy can be corrosion-resistant even in a nonoxidizing atmosphere such as hydrochloric acid and sulfuric acid.

Further, the passive film is tough and does not break even when attacked by chloride ion. Thus, the passive film is little liable to erosion, void corrosion, stress corrosion cracking, etc., which are remarkable in stainless steel. Accordingly, the passive film exhibits an extremely excellent corrosion resistance against sea water. As a result, a rolling bearing formed by a titanium alloy cannot be disabled even when sea water enters thereinto.

Moreover, a titanium alloy also exhibits an excellent corrosion resistance against many organic acids and is not liable to deterioration of cold-workability or deterioration by impure elements.

Thus, a titanium alloy exhibits an extremely excellent corrosion resistance as compared with stainless steel.

The comparison of titanium alloy with ceramics material such as $Si_3N_4$ in corrosion resistance shows that a titanium alloy undergoes so-called overall corrosion against some alkaline solutions such as NaOH and KOH solutions and thus cannot be used in such an alkaline atmosphere but exhibits corrosion resistance equal to ceramics in special atmospheres other than the alkaline atmosphere.

A ceramics material exhibits a low toughness and thus is not suitable for use under working conditions subject to great impact load while a titanium alloy exhibits a toughness about three times that of $Si_3N_4$. In other words, a titanium alloy exhibits a toughness equal to stainless steel. Thus, if a titanium alloy is used as a race., it is extremely unlikely that the bearing can break as compared with the case where a ceramics material is used.

Further, ceramics cannot be subjected to plastic working as metallic materials. Therefore, in order to produce a race from ceramics, ceramics must be subjected to a continuous complicated production method which comprises compressing a powdered ceramics into a ring, sintering the material, subjecting the material to HIP (hot isostatic pressing) so that it is densed, and then grinding the material. Thus, ceramics materials exhibit a poor productivity as compared with metallic materials. Further, a large-sized race can hardly be produced from a ceramics material. Moreover, ceramics materials exhibit a remarkably deteriorated grindability as compared with metallic materials, thereby increasing the production cost.

On the other hand, a titanium alloy exhibits a deteriorated workability as compared with a steel material such as stainless steel but a sufficient plastic deformability. A titanium alloy exhibits an excellent grindability as compared with ceramics. Further, working facilities for steel material can be used for titanium alloy. Therefore, existing facilities can be used, eliminating the necessity of equipment investment. The production cost can be reduced.

A titanium alloy is a nonmagnetic material. Thus, even if a titanium alloy is used in a magnetic atmosphere such as semiconductor producing apparatus and superconduction-related apparatus, disturbance in the magnetic field can be avoided. Further, the rise or variation in the rotary torque of the bearing due to magnetic field can be inhibited.

The inhibition of the rise or variation in the rotary torque is more remarkable when the rolling elements are formed by a nonmagnetic ceramics.

On the other hand, in order to avoid the rise in the bearing temperature even in a tool machine which operates at a high rotary speed, it is effective to form the races, particularly inner race, by a titanium alloy.

As previously mentioned, the rise in the bearing temperature developed when the bearing rotates at a high speed is attributed to the reduction of bearing clearance accompanying the high speed rotation. The reduction of bearing clearance is attributed not only to the thermal expansion due to the difference in temperature between the inner race and the outer race but also to the expansion of the inner race due to the centrifugal force caused by the rotation of the rotary axis.

Accordingly, in order to inhibit the rise in the bearing temperature accompanying the high speed rotation, it is necessary that a material having a small linear expansion coefficient be selected to inhibit the thermal expansion. In order to reduce the centrifugal force, it is necessary that a material having a small density be selected.

The comparison of Ti-6Al-4V alloy as a titanium alloy with SUS440C as a stainless steel shows that the linear expansion coefficient of Ti-6Al-4V alloy is as small as 80% of that of SUS440C. Therefore, if Ti-6Al-4V alloy is used as an inner race material, the reduction in the bearing clearance accompanying the difference in temperature between the inner race and the outer race can be drastically reduced as compared with the use of stainless steel.

Further, the density of Ti-6Al-4V alloy is as small as about 60% of that of SUS440C. As a result, Ti-6Al-4V alloy gives a lower centrifugal force than stainless steel. Thus, the inner race formed by Ti-6Al-4V alloy expands less than that formed by stainless steel.

As mentioned above, by using a titanium alloy as an inner race, the reduction in the bearing clearance during high speed rotation can be avoided, thereby inhibiting the rise in friction. As a result, the rise in the bearing temperature can be inhibited.

When the race and the rolling elements come in contact with each other under a predetermined load, the contact portion undergoes elastic deformation to form a contact ellipse the size of which depends on the Young's modulus of the race and the rolling elements.

Ceramics exhibit a greater Young's modulus than metallic materials and thus undergo little elastic deformation. Accordingly, the race receives a higher face pressure when the rolling elements are formed by ceramics than when the rolling elements are formed by a metallic material. On the other hand, a titanium alloy exhibits a Young's modulus as small as about half that of stainless steel. Accordingly, the contact ellipse is larger when the race is formed by a titanium alloy than when the race is formed by a stainless steel. Thus, the contact portion receives a lower face pressure when the race is formed by a titanium alloy than when the race is formed by a stainless steel. Therefore, the use of a titanium alloy as a race makes it possible to relax the rise in the contact face pressure which can occur when rolling elements made of ceramics is used and improve the rolling fatigue life of the bearing.

As the titanium alloy to be used for race there may be used ($\alpha+\beta$) type titanium alloy such as Ti-6Al-4V, Ti-3Al-2.5V and Ti-6Al-2Sn-4Zr-6Mo or $\beta$ type titanium alloy such as Ti15Mo-5Zr, Ti-15Mo-5Zr-3Al, Ti-15V-3Sn-3Al-3Cr, Ti-10V-2Fe-3Al, Ti-3Al-8V-6 Cr-4Zr and Ti-22V-3Al, which can be subjected to heat treatment to have a high strength and a high toughness.

Preferred among the titanium alloys listed above are $\beta$ type titanium alloys, which exhibit an excellent cold-workability, taking into account workability. Particularly preferred among these $\beta$ type titanium alloys are Ti-15Mo titanium alloys such as Ti-15Mo-5Zr and Ti-15Mo-5Zr-3Al, which are particularly excellent in corrosion resistance.

($\alpha+\beta$) type titanium alloys have a great content of alloying elements having a smaller density than Ti. Thus, ($\alpha+\beta$) type titanium alloys, which have a small mass, are preferably used in terms of reduction of centrifugal force.

In order to secure the bearing strength, the titanium alloy needs to be subjected to heat treatment so that it is reinforced as a ($\alpha+\beta$) two-phase texture.

Pure titanium and $\alpha$ type titanium alloy such as Ti-0.3Mo-0.8Ni have an $\alpha$ single phase microstructure and hence a lower strength than the foregoing ($\alpha+\beta$) type titanium alloys or $\beta$ type titanium alloys and thus cannot used as race materials.

It is said that the surface hardness HRC of the race needs to be not less than 57 to provide an endurable bearing. However, if the foregoing titanium alloy is used as a race, even if the material has been hardened by aging after solution treatment, the resulting surface hardness is as small as about 40 to 45, making it impossible to provide a surface hardness required for bearing. Further, the resulting bearing exhibits a poor seizing resistance and thus is liable to adhesive abrasion.

The foregoing titanium alloy is preferably subjected to heat treatment such as atmospheric oxidation, gaseous nitriding, boriding, wet plating, TiC or TiN coating by CVD method or PVD method and ion injection to obtain a desired surface hardness HRC. Taking into account the convenience of treatment, atmospheric oxidation or gaseous nitriding is desirable.

In the present embodiment, at least the inner race is formed by a titanium alloy. In a preferred embodiment, both the inner race and the outer race are formed by a titanium alloy to provide a better corrosion resistance in a working atmosphere such as food machine, semiconductor producing apparatus and chemical fiber producing machine which is liable to be contaminated by a corrosive material such as water content, sea water and chemicals. In a machine tool or other machines which operate at a high rotary speed, it is important to inhibit the rise in the inner race temperature. Therefore, the inner race needs to be formed by a titanium alloy, but the outer race is preferably formed by a steel material such as SUJ2 and stainless steel, which exhibits a greater linear expansion coefficient than the titanium alloy constituting the inner race.

(2) Rolling Elements

The reason why the rolling elements are formed by ceramics in the present embodiment will be described hereinafter.

Ceramics are insulating materials. Rolling elements formed by ceramics is not liable to so-called galvanic corrosion even when it comes in contact with a race formed by a titanium alloy and thus is extremely excellent in corrosion resistance as compared with that formed by a metallic material.

Ceramics are also nonmagnetic materials. Thus, rolling elements formed by ceramics causes no variation of rotary torque of bearing even when used in a magnetic field. Accordingly, ceramics are suitable for use in a special working atmosphere subject to magnetic field such as semiconductor producing apparatus and superconduction-related apparatus.

Further, ceramics have a smaller density than stainless steel. The comparison of $Si_3N_4$ as ceramics with SUS440C as stainless steel shows that the density of $Si_3N_4$ is about 40% of that of SUS440C. Accordingly, the use of ceramics, which have a smaller density than stainless steel, makes it possible to provide rolling elements having a lighter weight. When the rolling bearing operates at a high rotary speed, such rolling elements give a reduced centrifugal force that applies a reduced load to the outer race, making it possible to inhibit the deterioration of durability.

In other words, when a rolling bearing operates at a high rotary speed, the high speed rotation is accompanied by the rise in centrifugal force that causes the rolling elements to apply nonneglible load to the outer race. Thus, the contact load of the rolling elements on the outer race is raised, reducing the life of bearing or raising the amount of heat generated by friction. Further, since the centrifugal force of the rolling elements are proportional to the mass of the rolling elements as well known, the greater the mass of the rolling elements are, the greater is the foregoing contact load.

Thus, in the present embodiment, the use of ceramics as rolling element material provides rolling elements having a reduced weight that inhibits the generation of heat by friction and hence the reduction of the life of bearing.

In a rolling bearing having a contact angle such as angular contact ball bearing, the rolling elements are acted upon by gyroscopic moment. When the gyroscopic moment becomes greater than the frictional force at the portion where the rolling elements come in contact with the race, a violent revolutionary slip called skidding occurs to cause further friction. The reduction of the weight of the rolling elements also makes it possible to reduce the gyroscopic moment.

Further, rolling elements formed by the same titanium alloy having an excellent corrosion resistance as used for the race exhibit a strong adhesion and thus is liable to seizing or galling. On the contrary, rolling elements formed by ceramics, which differ from the material of the race, exhibit improved seizing resistance and galling resistance. In particular, a titanium alloy is an active metal and thus exhibits a deteriorated seizing resistance. Accordingly, the use of ceramics as rolling element material makes it possible to improve the seizing resistance of the titanium alloy used as race.

As the ceramics to be used as rolling element material there may be used SiAlON, zirconia ($ZrO_2$), silicon carbide (SiC), alumina ($Al_2O_3$) or the like besides $Si_3N_4$. $Si_3N4$ exhibits a small density, a low linear expansion coefficient, a high thermal impact resistance and excellent flexural strength and fracture toughness and thus can be used as rolling elements for use under high speed rotary conditions.

The present invention is not limited to the present embodiment. With respect to the bearing for use in a corrosive working atmosphere, the rolling elements are preferably formed by a stainless steel depending on the application.

In this case, the rolling elements are formed by a stainless steel, which differ from the material of the race, i.e., titanium alloy as in the case where the rolling elements are formed by ceramics. When the bearing rotates, the different kinds of metals come in contact with each other.

In general, when different kinds of metals come in contact with each other in a solution, galvanic corrosion occurs to accelerate the corrosion of the metal which is electronegatively greater than the other. Accordingly, when rolling elements made of stainless steel, which is electronegatively greater than titanium alloy, come in contact with a race made of titanium alloy, the rolling elements corrode remarkably, possibly causing a drastic reduction of the bearing life.

Stainless steel is electronegatively greater than titanium alloy in the order of corrosion tendency in sea water. However, the two metals have an extremely small potential difference (see "Titan Kako Gijutsu (Titanium Processing Technique)", compiled by Japan Titanium Society, page 208 (published by Nikkan Kogyo Shinbunsha, 1992). Thus, little or no galvanic corrosion occurs even when a titanium alloy and a stainless steel come in contact with each other in sea water.

Accordingly, as the rolling element material there may be used a general-purpose stainless steel in some cases. In other words, in some cases, the use of stainless steel as rolling element material rather than expensive ceramics makes it possible to maintain sufficient corrosion resistance and hence reduce the production cost. Further, the use of stainless steel as rolling element material also makes it possible to reduce the contact face pressure as compared with ceramics material which is little liable to elastic deformation.

SECOND EMBODIMENT

In the rolling bearing according to the second embodiment of the present invention, at least one of the inner race and outer race is formed by a β type titanium alloy and the percent cold working of the race is predetermined to not less than 20%.

Among the titanium alloys having an excellent corrosion resistance, a β type titanium alloy exhibits a high strength and an excellent cold-workability in the form of solid solution. In other words, a β type titanium alloy which has been subjected to solution treatment at a predetermined temperature can be rapidly cooled to obtain a soft β single phase having a body-centered cubic lattice (bcc) structure at room temperature. Among materials belonging to β type titanium alloy, there is a reinforcible material having a percent cold working η of not less than 90% as represented by the following equation (1). The use of such a material makes it possible to omit the grinding step.

$$\eta = \{(l_0 - 1)/l_0\} \times 100 \tag{1}$$

wherein $l_0$ represents the height of the material before cold working; and 1 represents the height of the material after cold working.

In other words, a titanium alloy exhibits an excellent corrosion resistance but a small thermal conductivity and thus generates heat at the area where it comes in contact with the grinding tool during grinding that gives a great stress to the cutting edge. Thus, a titanium alloy is disadvantageous in that it exhibits a deteriorated grindability. In the second embodiment of the present invention, β type titanium alloy, which exhibits an excellent cold-workability, is used. The β type titanium alloy is subjected to solution treatment to give a soft β single phase which is then subjected to cold working. This cold working causes the production of a large amount of lattice defects that cause dislocation. Thus, hard α phase is uniformly and finely deposited in β crystalline grains. In this manner, both the surface hardness HRC and the strength of the material can be enhanced, making it possible to enhance the durability of the rolling bearing itself.

In other words, it is a common practice that the bearing material which has been subjected to solution treatment is subjected to aging for hardening. However, if the bearing material which has been subjected to solution treatment is not subjected to cold working before aging, α phase is deposited preferentially at the grain boundary in layer during aging but less in β crystalline grains, providing an extremely nonuniform aged texture.

On the contrary, if the bearing material which has been subjected to solution treatment is subjected to cold working before aging, the cold working (plastic working) causes a large amount of dislocation to be introduced into β crystalline grains, and the dislocation becomes a nucleus production ground for deposition of α phase. Thus, hard α phase is uniformly and finely deposited in soft β crystalline grains, increasing the surface hardness of the material.

In other words, a β type titanium alloy obtained by aging a titanium alloy which has been subjected to solution treatment free from cold working has a surface hardness HRC of about from 40 to 48. On the contrary, a titanium alloy obtained by subjecting a solution-treated titanium alloy to cold working followed by aging can be provided with a surface hardness HRC of not less than 57 and hence a raised strength that improves the life of the rolling bearing.

The solution treatment temperature, percent cold working η and aging time T will be described hereinafter.

(1) Solution Treatment Temperature

If solution treatment is effected at a temperature of not higher than the critical temperature at which β transition, i.e., β phase is transformed to (α+β) phase, initial α phase is deposited, causing a remarkable deterioration of workability. Accordingly, the solution treatment temperature needs to be not lower than β transition. On the contrary, if solution treatment is effected at an excessively high temperature, the resulting β crystalline grains are remarkably coarse, causing a strength drop. Thus, in the present embodiment, the solution treatment temperature is predetermined to a range of from β transition to (α+150° C.).

(2) Percent Cold Working η

A titanium alloy obtained by subjecting a solution-treated titanium alloy to cold working before aging exhibits enhanced surface hardness HRC and strength. As described later, such a titanium alloy which has been subjected to cold working can be aged in a reduced time. However, the density of dislocation introduced by cold working varies, affecting the surface hardness HRC or strength. In other words, if the percent cold working η is predetermined to not more than 20%, the resulting dislocation is nonuniform, causing α phase to be deposited preferentially at the grain boundary. Further, when α phase is deposited in layer at the grain boundary, break can easily occur at the interface of β crystalline grain with α phase, causing a strength drop.

On the contrary, if the percent cold working η is not less than 20%, dislocation is uniformly introduced into crystalline grains. Thus, α phase is uniformly and finely deposited in β crystalline grains with the foregoing dislocation as a nucleus production ground during aging, enhancing the surface hardness HRC and strength.

It is considered that the degree of reinforcing by cold working follows n-order hardening rule represented by the equation (2):

$$\sigma = AE^n \quad (2)$$

wherein σ represents true stress; E represents true strain; A represents reinforcement coefficient; and n represents work-hardening index. A β type titanium alloy exhibits a smaller work-hardening index than steel material and thus is akin to completely plastic material. Thus, the percent cold working η can be raised without any problem. In particular, when the percent cold working η is within the range of not less than 30%, a bearing material having a stabilized hardness can be obtained. Accordingly, cold working may be effected at a percent cold working η of not less than 20% to obtain a predetermined height.

From these standpoints of view, the percent cold working η is predetermined to not less than 20%, preferably not less than 30%, in the present embodiment.

(3) Aging Time T

As mentioned above, the dislocation introduced during cold working becomes a nuclear production ground which accelerates the deposition of α phase in β crystalline grains. As a result, the time required until overaging is reached can be reduced, making it possible to drastically reduce the aging time T. However, if aging is effected over an excessively prolonged period of time, averaging occurs, causing hard α phase to grow coarsely. Thus, the material softens, causing a drop of surface hardness HRC and hence a reduction of the bearing life. Further, if the aging time T is predetermined excessively long, an intermetallic compound is deposited as a final stable phase, remarkably embrittling the bearing material. As a result, the surface hardness and submerged life of the bearing can be reduced. From these standpoints of view, the aging time T is preferably predetermined to 5 to 10 hours in the present embodiment.

FIG. 1 is a chart illustrating the method for the production of the bearing material according to the embodiment of the present invention.

In other words, a β type titanium alloy is subjected to solution treatment at a temperature (β transition to (β transition +150° C.), e.g., 800° C. to 1,000° C., in an Ar atmosphere or in vacuum, and then rapidly cooled to give a soft β single phase having bcc structure. The titanium alloy thus treated is then subjected to cold working at a percent working η of not less than 20% to form races. The titanium alloy is then formed into a race. Referring to the method for forming race, the titanium alloy is subjected to near net shaping (semi-finished shaping) to minimize the number of steps required for grinding. Accordingly, the titanium alloy is preferably subjected to cold working by cold rolling forging. The titanium alloy thus cold-worked is then subjected to aging at a temperature of from 400° C. to 550° C. for 5 to 10 hours. In this manner, a race material having α phase deposited uniformly and finely in β crystalline grains can be produced. The race material thus obtained can be then subjected to a predetermined finishing such as grinding to finally obtain a race made of β type titanium alloy.

As mentioned above, a β type titanium alloy exhibits an excellent cold-workability. Thus, the kind of β type titanium alloy to be used in the present invention is not specifically limited. However, even an alloy belonging to β type titanium alloy is liable to instabilization of residual β phase depending on its alloy composition. If subjected to cold working, such a β type titanium alloy can form a work-induced martensite. However, the foregoing work-induced martensite can crack if the percent cold working η is great. Accordingly, among β type titanium alloys, a β type titanium alloy which hardly forms such a work-induced martensite is preferably used. In particular, a Ti-Mo-based β type titanium alloy such as Ti-15Mo-5Zr and Ti-15Mo-5Zr-3Al is preferably used for positions requiring corrosion resistance.

THIRD EMBODIMENT

In the rolling bearing according to the third embodiment of the present invention, at least one of the inner race and the outer race is formed by a β type titanium alloy, the percent cold working is predetermined to a range of from 5 to 20%, and the cold working is followed by shot peening.

Figure 2:
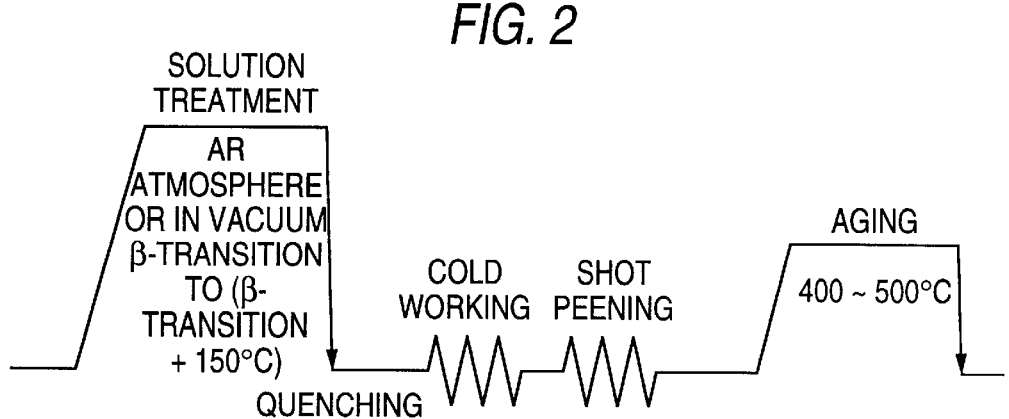
FIG. 2 is a chart illustrating a third embodiment of the method for the production of the bearing material according to the embodiment of the present invention.

In the third embodiment of the present invention, as shown in FIG. 2, a titanium alloy is subjected to solution treatment, and then rapidly cooled in the same manner as in the second embodiment of the present invention. The titanium alloy thus treated is then subjected to cold working such as cold rolling forging. The titanium alloy is then subjected to shot peening. The titanium alloy is then finally subjected to aging to produce a rolling bearing having a surface hardness Hv of not less than 600.

The reason why a β type titanium alloy which has been subjected to shot peening has a hardened surface layer will be described hereinafter.

In other words, the shot peening of β single phase texture obtained by rapidly cooling the solution-treated titanium alloy causes the surface layer to undergo plastic deformation that causes the introduction of a large amount of dislocation. When the titanium alloy thus treated is then aged, hard α phase is deposited in the plastically-deformed surface layer with a high density dislocation as nucleating site. Thus, the shot peening causes the surface layer to have more nucleating sites at which a-phase is deposited than the core which undergoes not plastic deformation. As a result, a phase is finely and uniformly deposited in the surface layer similarly to cold working, drastically hardening the surface layer alone.

However, as mentioned above, if a β type titanium alloy material which has been subjected to solution treatment is then directly subjected to shot peening, the work strain thus provided and its depth are limited, limiting the rise in the surface hardness.

Thus, in the third embodiment of the present invention, a titanium alloy is subjected to cold working at a percent working of from 5 to 20% before shot peening to obtain a rolling bearing having a good toughness as well as a surface hardness Hv of not less than 600.

The reason why the percent cold working is predetermined to a range of from 5 to 20% will be described hereinafter.

In other words, if a titanium alloy is subjected to cold working, there is a fear that the metallic texture is hardened to the core to thereby impair its toughness. Therefore, in order to obtain a good toughness, it is preferred that a titanium alloy be not subjected to cold working or be subjected to cold working at a low percent working. However, if the percent cold working falls below 5%, a titanium alloy exhibits a surface hardness Hv as small as not more than 600 even when subjected to shot peening and thus cannot provide a surface hardness required for rolling bearing. On the contrary, if the percent cold working exceeds 20%, a titanium alloy exhibits a remarkably reduced toughness. Accordingly, in the present embodiment, the percent cold working is predetermined to a range of from 5 to 20%.

If a titanium alloy is subjected to cold working at a percent working of from 5 to 20%, followed by shot peening, it is provided with a work strain in the surface layer as much as obtained when it is subjected to cold working at a high percent working. When the titanium alloy is then subjected to aging, its core undergoes aged hardening to an extent such that the toughness thereof is not impaired, and the micro-deposition of hard α phase in the surface layer proceeds to cause hardening.

Thus, in accordance with the third embodiment of the present invention, a rolling bearing suitable for use in working atmospheres requiring toughness can be obtained.

Figure 3:
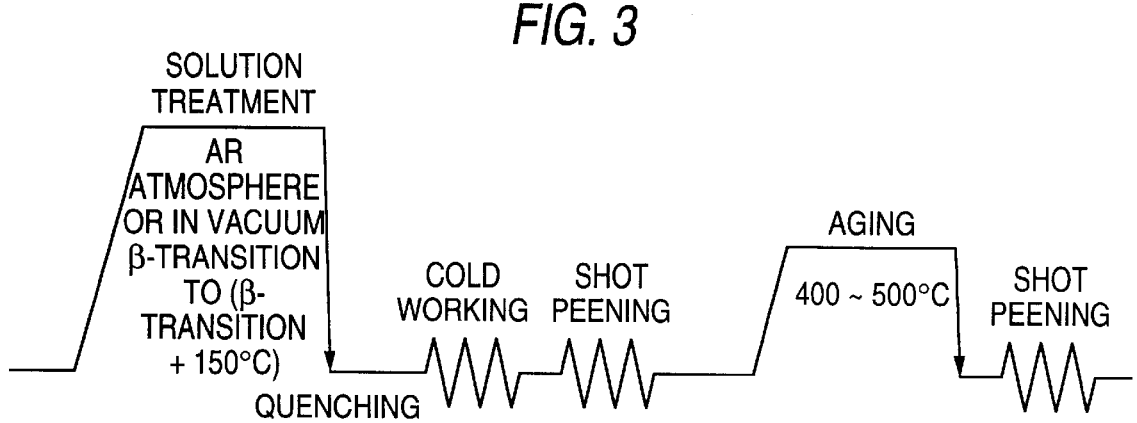
FIG. 3 is a chart illustrating a modification of the third embodiment of the method for the production of the bearing material according to the embodiment of the present invention.

FIG. 3 is a chart illustrating a modification of the third embodiment of the present invention. In this modification, a titanium alloy which has been subjected to aging is again subjected to shot peening.

Shot peening originally exerts an effect of applying residual compression stress to the surface layer to enhance its fatigue strength.

Shot peening after cold working can enhance the surface hardness of a titanium alloy. However, since work strain which has been given by shot peening can be released during a prolonged heating and storage at the aging step, the residual compression stress is reduced after the termination of aging, possibly making it impossible to enhance the fatigue strength of the titanium alloy.

Thus, in this modification, a titanium alloy which has been subjected to aging is again subjected to shot peening as shown in FIG. 3 so that the surface layer thereof is provided with a high residual compression stress to enhance the fatigue strength thereof.

In other words, if a β type titanium alloy is used as a race material, even when residual β phase is subjected to plastic deformation, the residual β phase which has been aged has β phase-stabilizing elements in a high concentration to show a high degree of stabilization of β phase. Thus, unlike steel material such as stainless steel, the β type titanium alloy does not undergo work-induced martensite transformation. However, since the residual β phase exhibits a very great plastic transformability, it can have a large amount of work strain accumulated therein as compared with steel materials when subjected to shot peening. As a result, the β type titanium alloy can be provided with a high residual compression stress, making it possible to enhance the fatigue strength thereof.

In accordance with this modification, a rolling bearing suitable for use in working atmospheres particularly requiring excellent fatigue life and fatigue strength can be obtained.

FOURTH EMBODIMENT

In the rolling bearing according to the fourth embodiment of the present invention, at least one of the inner race and the outer race is formed by a β type titanium alloy, the percent cold working is predetermined to not less than 20%, and the content of residual β phase in the β type titanium alloy is predetermined to a range of from 30 to 80 vol %.

When the rolling bearing operates with a lubricant contaminated by foreign matters, impressions are formed by the foreign matters on the surface layer of the race, possibly reducing the bearing life. Thus, when a steel material such as stainless steel is used, the following countermeasure is taken. As previously mentioned, the edge of the impressions are allowed to undergo plastic deformation when they repeatedly come in contact with the rolling elements which pass thereby during the period between the formation of the impressions and the generation of cracks in the edge of the impressions so that the concentration of stress on the edge of the impressions is relaxed, making it possible to prolong the life of bearing when the lubricant is contaminated by foreign matters.

In other words, residual austenite contained in steel materials is a soft texture liable to plastic deformation. When a high stress is concentrated on the edge of impressions formed by foreign matters which have entered in the lubricant on the surface layer of a race made of steel material, the edge of the impressions can easily undergo plastic deformation as well as stress-induced transformation so that it is transformed to a hard martensite texture. As a result, the edge of the impressions shows a hardness rise. When the drop of concentration of stress and the hardness rise are balanced, the edge of the impressions no longer undergoes plastic deformation. To be short, when a race made of a steel material operates with a lubricant contaminated by foreign matters, the residual austenite texture exerts an effect of enhancing fatigue strength due to stress relaxation and martensite transformation to improve the bearing life.

In the case of β type titanium alloy, residual β phase exerts the same effect as exerted by residual austenite in steel materials. In other words, a β type titanium alloy is subjected to solution treatment at a β phase temperature of not lower than β transition, and then rapidly cooled to give a residual β single phase which normally stays soft. Subsequently, the titanium alloy is subjected to aging to cause hard α phase to be uniformly and finely deposited in the surface layer, thereby forming an (α+β) texture and enhancing the surface hardness.

In other words, the β type titanium alloy forms a two-phase texture having a hard α phase deposited in a soft β phase texture. Thus, when the rolling bearing operates with a lubricant contaminated by foreign matters, the edge of impressions formed on the soft residual β phase is allowed to undergo plastic deformation when it repeatedly comes in contact with the rolling elements passing thereby during the period between the formation of the impressions and the generation of cracks in the edge of the impressions, making it possible to relax the concentration of stress on the edge of the impressions.

Further, unlike steel materials, the β type titanium alloy forms an (α+β) two-phase texture when subjected to aging. Thus, β stabilizing elements are concentrated in β phase to raise the stability of β phase, preventing martensite transformation during working and hence causing no enhancement of the hardness of the periphery of the impressions.

In other words, since the residual β phase in the β type titanium alloy exhibits an extremely high transformability, it can repeatedly form impressions therein. As a result, the impressions can easily undergo plastic deformation to relax stress concentration thereon even when they come in contact with the rolling elements passing thereby. Further, the β type titanium alloy exhibits a smaller work-hardening index n (see the equation (2) in the second embodiment) than steel material. By making the best use of the characteristics, the β type titanium alloy undergoes no extreme hardening even when repeatedly subjected to plastic deformation that causes the introduction of a large amount of strain and thus is little liable to cracking, making it possible to improve the life of the bearing which operates with a lubricant contaminated by foreign matters.

In the fourth embodiment of the present invention, too, if a titanium alloy is merely subjected to solution treatment and aging, it cannot be provided with a surface hardness Hv required for bearing. Thus, the titanium alloy which has been subjected to solution treatment followed by rapid cooling needs to be subjected to cold working similarly to the second and third embodiments.

The residual β phase, percent cold working η, and aging temperature will be described hereinafter.

(1) Residual α Phase

As mentioned above, the presence of residual β phase is effective for the prevention of reduction of the life of bearing even when the lubricant is contaminated by foreign matters. If the content of residual β phase falls below 30 vol %, the proportion of residual β phase in the bearing material is too small to provide a stably prolonged bearing life when the lubricant is contaminated by foreign matters. On the contrary, since the residual β phase is soft, if the content of residual β phase is too great, the resulting rolling bearing exhibits an insufficient hardness and thus cannot operate over a desired life. To be short, if the content of residual β phase exceeds 80 vol %, the amount of α phase deposited in the surface layer of the β type titanium alloy is too small to provide a sufficient surface hardness at the initial stage of aging. As a result, even after aging, a desired surface hardness cannot be obtained, making it impossible to provide a desired bearing life. Accordingly, the volumetric proportion of residual β phase needs to be from 30 to 80 vol %.

The volumetric proportion of residual β phase can be obtained by removing the surface layer of an alloy material by a depth of about 50 μm by means of chemical polishing (e.g., with an aqueous solution of hydrofluoric acid and hydrogen peroxide), and then quantitatively analyzing the surface exposed by means of x-ray diffraction.

(2) Percent Cold Working η

As mentioned in the second embodiment of the present invention, if a titanium alloy which has been subjected to solution treatment is subjected to cold working such as cold rolling forging, it can exhibit an enhanced surface hardness HRC or strength when subjected to aging. In other words, cold working causes dislocation to be uniformly introduced into the crystalline grains. Thus, α phase is uniformly and finely deposited in β crystalline grains with the dislocation as a nucleus production ground, making it possible to enhance surface hardness HRC and strength. Thus, it is normally necessary that the percent cold working η be not less than 20%, preferably not less than 30%, similarly to the second embodiment of the present invention.

If an emphasis is placed on toughness, the percent cold working η is preferably predetermined to a range of from 5 to 20% on condition that the cold working is followed by shot peening as mentioned in the third embodiment.

(3) Aging Temperature

A titanium alloy which has been subjected to cold working needs to be subjected to aging for hardening. If the aging temperature falls below 400° C, ω phase is preferentially deposited. This ω phase remarkably hardens the surface layer but exerts an embrittling effect. Thus, the deposition of this ω phase needs to be avoided as much as possible. On the contrary, if the aging temperature exceeds 550° C., hard α phase can be deposited in the surface layer in a short period of time. However, grain boundary reaction type deposition becomes dominant, causing α phase to be preferentially deposited in layer at the residual β phase grain boundary. As a result, coarse acicular α phase is deposited in β grains, constituting a hindrance to surface hardening. In order to enhance surface hardness, it is preferred that the aging temperature be lowered. However, the aging time is prolonged. Accordingly, the aging temperature is preferably predetermined to a range of from 450° C. to 500° C.

The present invention will be further described in the following examples, but the present invention should not be construed as being limited thereto.

FIRST GROUP OF EXAMPLES

The inventors prepared disc-shaped specimens as races made of various titanium alloys and various steel materials.

Table 1 shows the name of the material of various specimens, the surface hardening method, the solution treatment conditions (or hardening conditions), and the aging conditions (or tempering conditions).

TABLE 1

| Race No. | Name of Material | Surface Hardening Method | Solution Treatment Conditions (or Hardening Conditions) | Aging Conditions (or Tempering Conditions) |
|---|---|---|---|---|
| A | Ti-6Al-4V | 850° C./10 hr. gaseous nitriding | 950° C. water cooling | 540° C./ 4 hr. |
| B | Ti-6Al-2Sn-4Zr-6Mo | " | 910° C. oil cooling | 590° C./ 4 hr. |
| C | Ti-15Mo-5Zr | " | 730° C. water cooling | 500° C./ 16.7 hr. |
| D | Ti-15Mo-5Zr-3Al | " | 735° C. water cooling | 450° C./ 16.7 hr. |
| E | Ti-15V-3Cr-3Sn-3Al | " | 800° C. water cooling | 450° C./ 6 hr. |
| F | Ti-10V-2Fe-3Al | " | 760° C. water cooling | 400° C./ 8 hr. |
| G | Ti-0.3Mo-0.8Ni | " | 700° C. annealing | — |
| H | Ti-5Ta | " | 700° C. annealing | — |
| I | Pure titanium (JIS3) | " | 700° C. annealing | — |
| J | SUS630H | Immersion hardening | 1,050° C. oil cooling | 500° C./ 1 hr. |
| K | SUS440C | " | 1,050° C. oil cooling | 180° C./ 2 hr. |
| L | SCR420 | 930° C./4 hr. Carburizing | 850° C. oil cooling | 180° C./ 2 hr. |
| M | SUJ2 | Immersion hardening | 850° C. oil cooling | 180° C./ 2 hr. |

The races A and B were made of (α+β) type titanium alloys, the races C to F were made of β type titanium alloys, the races G and H were made of α type titanium alloys, the race I was made of pure titanium (JIS3), and the races J to M were made of predetermined steel materials.

The races A to H, which had been made of titanium alloys, and the race I, which had been made of pure titanium, were subjected to gaseous nitriding at a temperature of 850° C. as surface treatment, and then cooled with nitrogen. The races A to F were subjected to solution treatment at a temperature of from 730 to 950° C. while being subjected to water cooling or oil cooling, and then subjected to aging at a temperature of from 450 to 590° C. for 4 to 10 hours to undergo hardening. On the other hand, the races G to I were subjected to gaseous nitriding, and then subjected to annealing at a temperature of 700° C.

The races J, K and M were subjected to immersion hardening at a temperature of from 850 to 1,050° C., and then subjected to tempering at a temperature of from 180 to 500° C. for 1 to 2 hours.

The race L was subjected to carburizing at a temperature of 930° C. for 4 hours, subjected to hardening at a temperature of 850° C., and then subjected to tempering at a temperature of 180° C. for 2 hours.

Table 2 shows the surface hardness HRC of the races, the results of salt spray corrosion test on these races, and the results of submerged life test on rolling bearings having rolling elements made of $Si_3N_4$.

TABLE 2

| Example No. | Race No. | Material of Rolling Elements | Surface Hardness (HRC) | Results of Salt Spray Corrosion Test | Submerged Life $L_{10}$ (× $10_6$ Cycle) |
|---|---|---|---|---|---|
| Example 1 | A | $Si_3N_4$ | 58.1 | Good | 25.3 |
| Example 2 | B | " | 58.3 | Good | 29.4 |
| Example 3 | C | " | 60.2 | Good | 33.4 |
| Example 4 | D | " | 60.0 | Good | 31.5 |
| Example 5 | E | " | 59.8 | Good | 28.3 |
| Example 6 | F | " | 58.1 | Good | 24.8 |
| Comparative Example 101 | G | " | −46.2 | Good | 3.8 |
| Comparative Example 102 | H | " | 46.5 | Good | 2.8 |
| Comparative Example 103 | I | " | 38.7 | Good | 3.6 |
| Comparative Example 104 | J | $Si_3N_4$ | 43.0 | Fair | 2.9 |
| Comparative Example 105 | K | " | 59.7 | Poor | 2.5 |
| Comparative Example 106 | L | " | 62.1 | Poor | 1.4 |
| Comparative Example 107 | M | " | 62.0 | Poor | 1.3 |

The β type titanium alloy used in Comparative Examples 101 and 102 and pure titanium used in Comparative Example 103 don't undergo hardening when subjected to heat treatment. Thus, all these races exhibit a surface hardness as low as not more than 47, making it impossible to provide a surface hardness sufficient for bearing.

On the contrary, the (α+β) type titanium alloy used in Examples 1 and 2 and the β type titanium alloy used in Examples 3 to 6 exhibit a surface hardness HRC of not less than 57 when subjected to heat treatment, making it possible to provide a surface hardness sufficient for bearing. Thus, a race which exhibits an excellent seizing resistance and thus is not liable to adhesive abrasion can be obtained.

For the salt spray corrosion test, a 5% aqueous solution of NaCl was used. The 5% aqueous solution of NaCl was sprayed onto the various races A to M at a temperature of 35° C. for 150 hours. After spraying, corrosion products were removed from these races A to M. The change in the weight of these races A to M was then determined. From these measurements, the corrosion rate per year was calculated, and the saline resistance was then evaluated. Referring to criterion for evaluation, when the corrosion rate is not more than 0.13 mm/year, the corrosion resistance is rated as "good". When the corrosion rate is from 0.13 to 1.3 mm/year, the corrosion resistance is rated as "fair (slightly poor)". When the corrosion rate is not less than 1.3 mm/year, the corrosion resistance is rated as "poor (unacceptable)".

Table 2 shows that all Comparative Examples 104 to 107, which comprise races made of steel material, corrode remarkably with rust and thus exhibit an insufficient corrosion resistance while Examples 1 to 6 and Comparative Examples 101 to 103, which comprise races made of titanium alloy, give good test results. In other words, concerning the saline resistance, the races made of steel material didn't give satisfactory results while the races made of titanium alloy, that is, not only β type titanium alloy or (α+β) type titanium alloy but also α type titanium alloy or pure titanium, gave satisfactory results.

The submerged life test will be described hereinafter.

Figure 4:
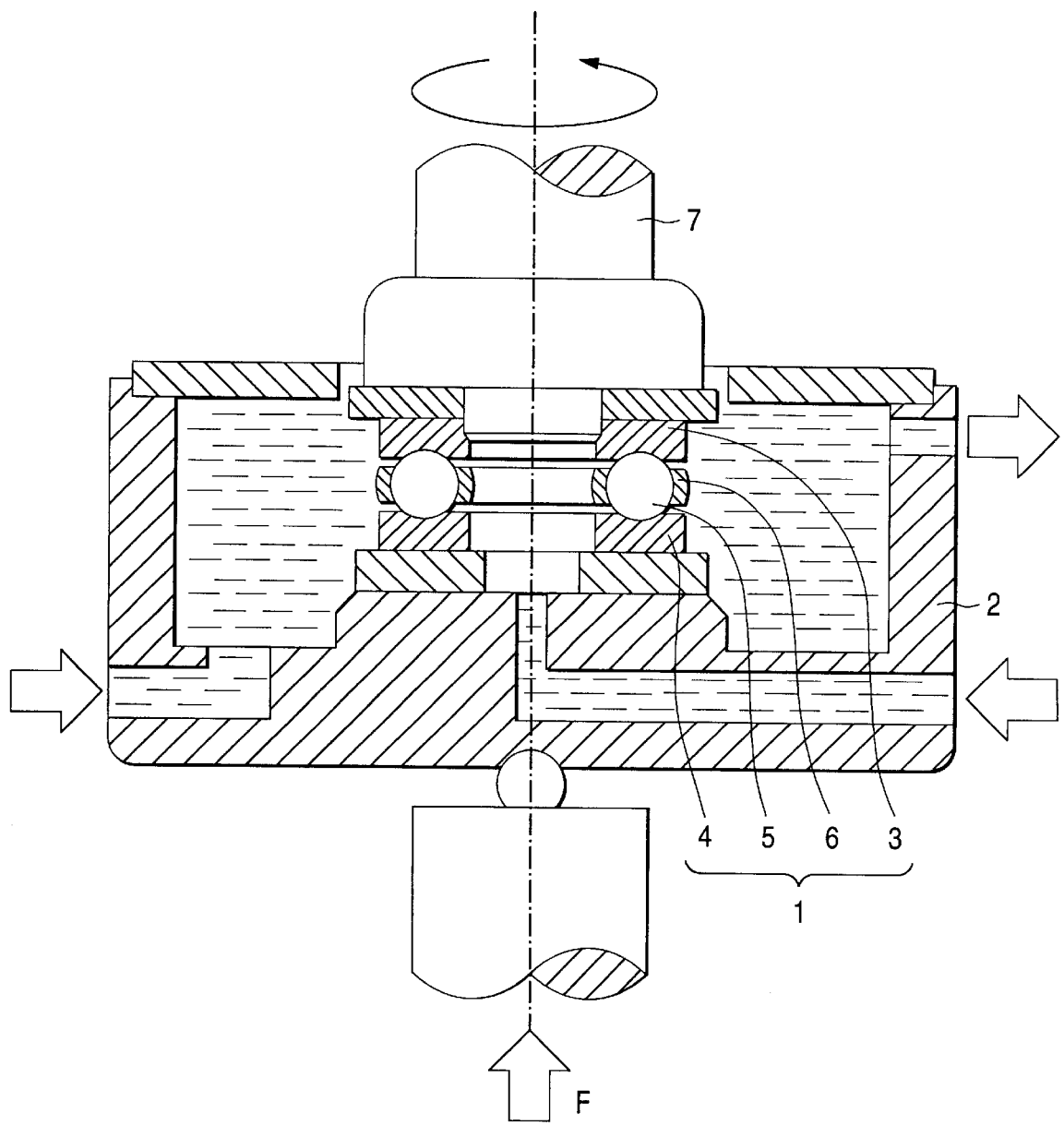
FIG. 4 is a diagram illustrating the inner structure of a submerged thrust bearing life testing machine for use in the submerged life test.

FIG. 4 is a schematic diagram illustrating the structure of a submerged thrust bearing life testing machine for use in the submerged life test. The various races (A to M) and the rolling elements made of $Si_3N_4$ were assembled into a thrust ball bearing 1. For the submerged life test, the thrust ball bearing 1 was immersed in the water in a testing tank 2. A rotary axis 7 was then allowed to rotate while the bearing was under a predetermined test load applied from the lower side. In FIG. 4, the reference numeral 3 indicates an inner race, the reference numeral 4 indicates an outer race, the reference numeral 5 indicates a ball, and the reference numeral 6 indicates a cage. As the water which fills the testing tank 2 there was used tap water. The tap water was supplied from the lower side of the testing tank 2, and then overflown from the upper side of the testing tank 2.

The submerged life test conditions will be described hereinafter.

Test Conditions

Bearing tested: Thrust ball bearing (Designation No. 51305)

Rotary speed of rotary axis: 1,000 rpm

Test load: 150 kgf

Material of rolling elements: $Si_3N_4$

Material of cage: Fluororesin

The inner race and outer race in each bearing to be used in the submerged life test were prepared from the same material, which is indicated in Table 3.

The submerged life $L_{10}$ indicates the time at which 10% of the specimens show a vibration level of 5 times the initial value as detected by an acceleration pick up sensor. The submerged life is quantitatively evaluated by the number of rotations cumulated until this point is reached.

Table 2 shows that Comparative Examples 101 to 107 exhibit an extremely short submerged life $L_{10}$. This is probably because Comparative Examples 101 and 102 and Comparative Example 103 use α type titanium alloys and pure titanium, respectively, and thus exhibit a reduced strength and a reduced surface hardness HRC and hence undergo early flaking due to surface fatigue. In Comparative Examples 104 to 107, the races were made of alloy steel and thus undergo remarkable corrosion abrasion and exhibit an extremely short bearing life.

On the contrary, in Examples 1 to 6, the races were made of a β type titanium alloy or (α+β) type titanium alloy. Combined with rolling elements made of $Si_3N_4$, these races exhibit a remarkably prolonged submerged life $L_{10}$.

SECOND GROUP OF EXAMPLES

The inventors prepared rolling elements made of SUS440C and SUJ2. Combined with these rolling elements, the races A to M set forth in Table 1 were subjected to salt spray corrosion test and submerged life test in the same manner as mentioned above.

Table 3 shows the combination of races and rolling elements and the results of the various tests on these combinations.

TABLE 3

| Example No. | Race No. | Material of Rolling Elements | Surface Hardness (HRC) | Results of Salt Spray Corrosion Test | Submerged Life $L_{10}$ (× $10^6$ Cycle) |
|---|---|---|---|---|---|
| Example 11 | A | SUS440C | 58.1 | Good | 12.3 |
| Example 12 | B | " | 58.3 | Good | 13.0 |
| Example 13 | C | " | 60.2 | Good | 15.9 |

TABLE 3-continued

| Example No. | Race No. | Material of Rolling Elements | Surface Hardness (HRC) | Results of Salt Spray Corrosion Test | Submerged Life $L_{10}$ (× $10^6$ Cycle) |
|---|---|---|---|---|---|
| Example 14 | D | " | 60.0 | Good | 16.5 |
| Example 15 | E | " | 59.8 | Good | 15.6 |
| Example 16 | F | " | 58.1 | Good | 14.2 |
| Comparative Example 111 | A | SUJ2 | 58.1 | Good | 1.2 |
| Comparative Example 112 | B | " | 58.3 | Good | 1.0 |
| Comparative Example 113 | C | " | 60.2 | Good | 0.9 |
| Comparative Example 114 | D | " | 60.0 | Good | 1.2 |
| Comparative Example 115 | E | SUJ2 | 59.8 | Good | 1.5 |
| Comparative Example 116 | F | " | 58.1 | Good | 1.3 |
| Comparative Example 117 | G | SUS440C | 46.2 | Good | 3.8 |
| Comparative Example 118 | H | " | 46.5 | Good | 2.8 |
| Comparative Example 119 | I | " | 38.7 | Good | 3.6 |
| Comparative Example 120 | K | " | 59.7 | Poor | 2.5 |

As can be seen in Comparative Examples 111 to 116, if SUJ2 (high carbon chromium bearing steel) is used as rolling element material, even when the race is made of β type titanium alloy or (β +β) type titanium alloy, the resulting rolling bearing exhibits a reduced submerged life $L_{10}$. This is because titanium alloy and SUJ2 greatly differ electronegatively from each other to cause galvanic corrosion that attacks and drastically wears the rolling elements made of SUJ2, which is electronegatively greater than titanium alloy.

In Comparative Examples 117 to 119, races made of α type titanium alloy or pure titanium and rolling elements made of SUS440C were combined. However, the α type titanium alloy or pure titanium used in the races exhibits a deteriorated strength and surface hardness. The resulting surface fatigue causes early flaking that reduces the submerged life $L_{10}$. In Comparative Example 120, a race made of SUS440C and rolling elements made of SUS440C were combined. However, this combination accelerates the corrosion, deteriorating both the submerged bearing life and saline resistance.

On the contrary, Examples 11 to 16 concern a combination of race made of β type titanium alloy or (α+β) type titanium alloy and rolling elements made of SUS440C. These combinations exhibit a reduced submerged bearing life as compared with the case where the race is made of $Si_3N_4$ (see Table 2). However, since there is little difference in electronegativity between titanium alloy and SUS440C, the progress of galvanic corrosion is inhibited, making it possible to secure some submerged bearing life.

As can be seen in the foregoing first and second groups of examples, the combination of (α+β) type or β type titanium alloy as race material and $Si_3N_4$ as rolling element material is most suitable for corrosion resistance. It is also made obvious that even rolling elements made of SUS440C can provide a sufficient bearing life in water or sea water.

THIRD GROUP OF EXAMPLES

The inventors prepared combined angular ball bearings from various titanium alloys and steel materials. The change in the bearing clearance and the expansion of the inner race during high speed rotation were then calculated. The rise in the temperature of the outer race was measured.

Figure 5:
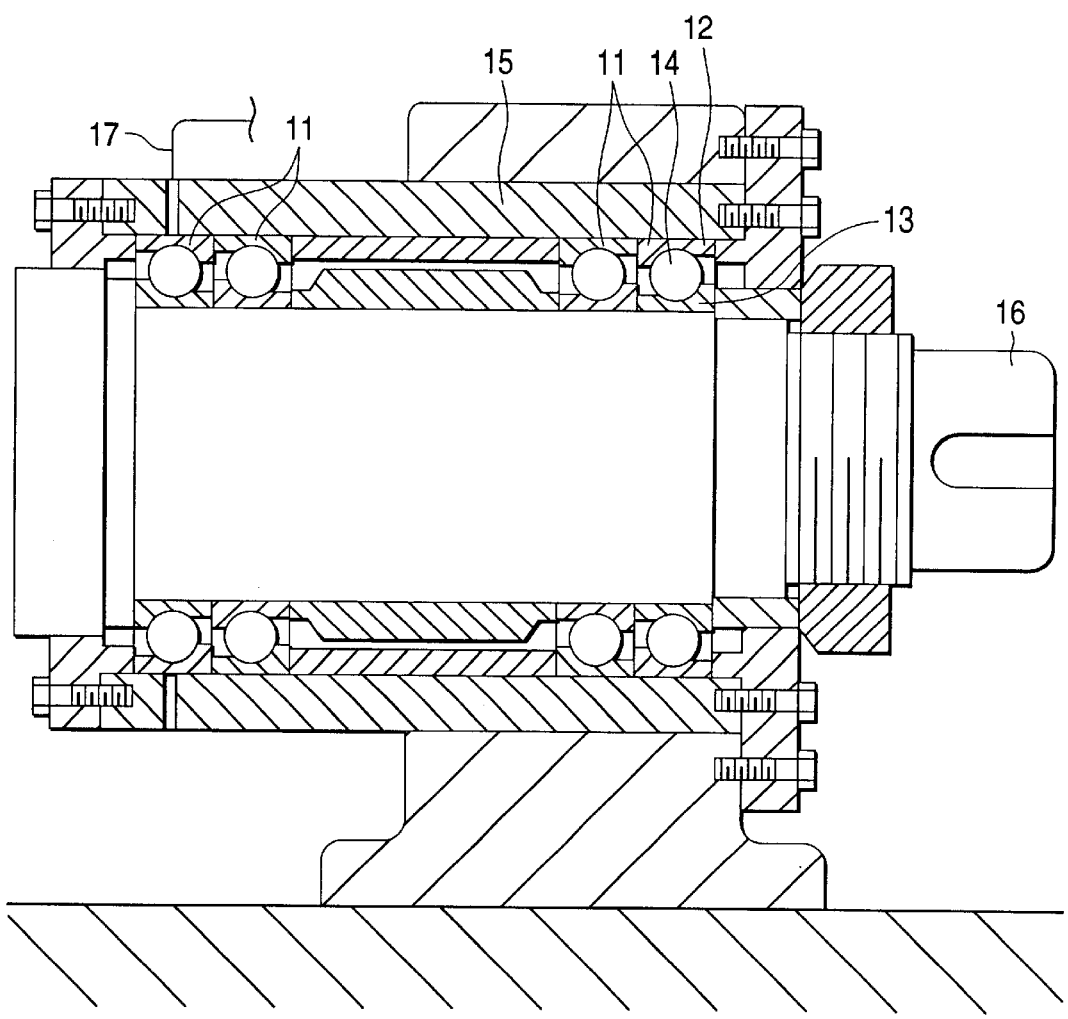
FIG. 5 is a sectional view illustrating a high speed rotary testing machine for use in the high speed rotary test.

Table 4 shows various bearing materials used in Examples 21 and 22 and Comparative Examples 131 to 136, the solution treatment conditions (hardening conditions) and the aging conditions (or tempering conditions).

machine shown in FIG. 5. The rise in the temperature of the outer race was then determined. In FIG. 5, the reference numeral 12 indicates an outer race, the reference numeral 13 indicates an inner race, and the reference numeral 14 indicates rolling elements.

In other words, the outer race 12 was incorporated in a housing 15, and the inner race 13 was put on a rotary axis

TABLE 4

| | Material | | | Inner Race Solution Treatment Conditions | Inner Race Aging Conditions |
|---|---|---|---|---|---|
| | Outer Race | Inner Race | Rolling Elements | (or Hardening Conditions) | (or Tempering Conditions) |
| Example 21 | SUJ2 | Ti-6Al-4V | $Si_3N_4$ | 900–950° C. water cooling | 500–540° C./4 hr. |
| Example 22 | SUJ2 | Ti-22V-4Al | $Si_3N_4$ | 750–800° C. water cooling | 450–500° C./4 hr. |
| Comparative Example 131 | SUJ2 | SUS440C | $Si_3N_4$ | 1050° C. oil cooling | 180° C./2 hr. |
| Comparative Example 132 | SUJ2 | SUJ2 | $Si_3N_4$ | 840° C. oil cooling | 180° C./2 hr. |
| Comparative Example 133 | SUJ2 | Ti-6Al-4V | SUJ2 | 900–950° C. water cooling | 500–540° C./4 hr. |
| Comparative Example 134 | SUJ2 | Ti-22V-4Al | SUJ2 | 750–800° C. water cooling | 450–500° C./4 hr. |
| Comparative Example 135 | Ti-6Al-4V | Ti-6Al-4V | $Si_3N_4$ | 900–950° C. water cooling | 500–540° C./4 hr. |
| Comparative Example 136 | Ti-22V-4Al | Ti-22V-4Al | $Si_3N_4$ | 750–800° C. water cooling | 450–500° C./4 hr. |

The inner races of Example 22 and Comparative Examples 134 and 136 were made of β type titanium alloy, and the inner races of Example 21 and Comparative Examples 133 and 135 were made of (α+β) type titanium alloy. These materials were each subjected to solution treatment and aging under conditions set forth in Table 4.

The inner races of Comparative Examples 131 and 132 were made of alloy steel. The alloy steel was subjected to hardening at a predetermined temperature, and then subjected to tempering at a predetermined temperature.

The inner races made of titanium alloy were coated with TiN on the raceway track to secure sufficient abrasion resistance and seizing resistance.

The rolling bearings of Examples 21 and 22 and Comparative Examples 131 to 136 were measured for change in the bearing clearance and expansion of the inner race during high speed rotation using a high speed rotary testing 16 so that a back-to-back type combined angular ball bearing 11 was mounted in the high speed rotary testing machine. The rotary axis 16 was then rotated. The temperature of the outer race 12 was then measured by means of a thermocouple 17 inserted in the housing 15.

The test conditions will be described hereinafter.

High Speed Test

Bearing tested: Back-to-back type angular ball bearing (Designation No. 7013C)
Preload during mounting: 10 kgf
Lubrication: Grease
Grease used: Isoflex NBU15 (produced by NOK Klüber Co., Ltd.)
Rotary speed of rotary axis: 12,000 rpm
Table 5 shows the results of high speed rotary test.

TABLE 5

| Example No. | Linear Expansion Coefficient of Inner Race Material (/° C.) | Density of Inner Race Material (g/cm³) | Density of Rolling Element Material (g/cm³) | Temperature Difference Between Inner Race and Outer Race(° C.) | Change in Bearing Clearance (μm) | Expansion of Inner Race (μm) | Rise in Inner Tace Temperature (° C.) |
|---|---|---|---|---|---|---|---|
| Example 21 | 0.0000088 | 4.43 | 3.2 | 7 | 2.1 | 2.9 | 8.7 |
| Example 22 | 0.0000085 | 4.69 | 3.2 | 7 | 2.8 | 3.0 | 8.5 |
| Comparative Example 131 | 0.0000101 | 7.70 | 3.2 | 7 | −0.7 | 4.5 | 10.8 |
| Comparative Example 132 | 0.0000125 | 7.83 | 3.2 | 7 | −8.1 | 5.1 | 12.4 |
| Comparative Example 133 | 0.0000088 | 4.43 | 7.83 | 7 | 2.1 | 2.9 | 11.4 |
| Comparative Example 134 | 0.0000085 | 4.69 | 7.83 | 7 | 2.8 | 3.0 | 11.2 |

TABLE 5-continued

| Example No. | Linear Expansion Coefficient of Inner Race Material (/° C.) | Density of Inner Race Material (g/cm³) | Density of Rolling Element Material (g/cm³) | Temperature Difference Between Inner Race and Outer Race(° C.) | Change in Bearing Clearance (μm) | Expansion of Inner Race (μm) | Rise in Inner Tace Temperature (° C.) |
|---|---|---|---|---|---|---|---|
| Comparative Example 135 | 0.0000088 | 4.43 | 3.2 | 7 | −5.7 | 4.9 | 11.6 |
| Comparative Example 136 | 0.0000085 | 4.69 | 3.2 | 7 | −5.5 | 5.1 | 11.5 |

For the evaluation of the bearing clearance, the change developed when the temperature difference between the inner race and the outer race reaches 7° C. was determined.

In Comparative Example 131, the outer race was made of SUJ2, the inner race was made of SUS440C, and the rolling elements were made of $Si_3N_4$. Since SUS440C exhibits a greater linear expansion coefficient than titanium alloy, the bearing clearance is reduced with the temperature difference between the inner race and the outer race being 7° C. Further, since SUS440C has a great density, it exhibits a great expansion due to centrifugal force, causing a great rise in the temperature of the outer race. In Comparative Example 132, both the inner race and the outer race were made of SUJ2, and the rolling elements were made of $Si_3N_4$. Since both the inner race and the outer race were made of SUJ2, the bearing clearance showed a remarkable drop, and the expansion of the inner race and the rise in the temperature of the outer race were raised.

In Comparative Examples 133 and 134, the outer race was made of SUJ2, the inner race was made of titanium alloy, and the rolling elements were made of $Si_3N_4$. Since the inner race was made of titanium alloy, the bearing clearance showed a rise rather than drop. The expansion of the inner race was small. However, the outer race showed a great temperature rise. This is probably because the rolling elements are made of SUJ2, which has a greater density than ceramics, and thus is given a great centrifugal force, resulting in the rise in the friction between the track on the race and the rolling surface of the rolling elements.

In Comparative Examples 135 and 136, both the inner race and the outer race were made of titanium alloy, and the rolling elements were made of $Si_3N_4$. Since the inner race and the outer race was made of the same material, the bearing clearance shows a drop and the expansion of the inner race is raised if evaluated with the temperature difference between the inner race and the outer race being 7° C. As a result, the rise in the temperature of the outer race is raised. Accordingly, taking into account the high speed rotary operation, the inner race and the outer race should not be made of the same material. However, since titanium alloy exhibits a smaller linear expansion coefficient than SUJ2, the reduction of the bearing clearance can be less than Comparative Example 132 in which both the inner race and the outer race are made of SUJ2. Accordingly, the rise in the temperature of the outer race can be inhibited more than in Comparative Example 132.

On the contrary, in Examples 21 and 22, the inner race was made of titanium alloy, and the rolling elements were made of $Si_3N_4$. Even if there occurs a temperature difference of 7° C. between the inner race and the outer race, the bearing clearance does not show a drop but increases. The expansion of the inner race due to centrifugal force is far less than in Comparative Examples 131 to 136. Thus, the rise in the temperature of the outer race during high speed rotation can be reduced to not more than 10° C. Accordingly, the rolling bearings according to these examples are suitable for high speed rotation.

As can be seen in the present group of examples, a combination of an inner race made of titanium alloy, an outer race made of steel material such as SUJ2 and rolling elements made of $Si_3N_4$ is optimum for bearing for use in machines which operate at a high rotary speed such as machine tool.

FOURTH GROUP OF EXAMPLES

The inventors prepared a disc-shaped specimen from Ti-15V-3Cr-3Sn-3Al as β type titanium alloy. The specimen was subjected to solution treatment at a temperature of 850° C. in an Ar atmosphere, water-cooled, and then subjected to cold rolling (cold working) at various percent cold working η. The specimen was subjected to aging at a temperature of 450° C. for 5 to 8 hours, and then measured for surface hardness Hv by means of a Vickers hardness testing machine.

Figure 6:
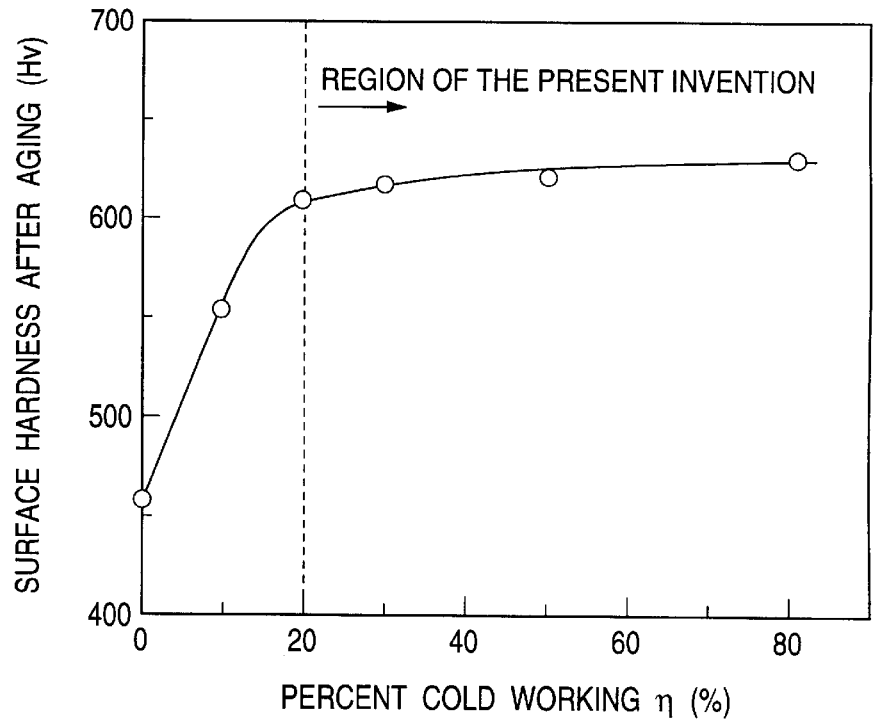
FIG. 6 is a characteristic curve illustrating the relationship between percent cold working η and hardness Hv after aging in the fourth group of examples.

FIG. 6 is a characteristic curve illustrating the relationship between percent cold working η and Vickers hardness Hv after aging.

There is a relationship represented by the following equation (3) between surface hardness Hv (Vickers hardness) and surface hardness HRC (Rockwell C hardness).

$$Hv=10HRC+30 \tag{3}$$

Accordingly, in order to obtain a surface hardness of not less than 57 as calculated in terms of HRC, it is necessary that the surface hardness Hv be not less than 600 according to the equation (3).

However, as evident from FIG. 6, if the percent cold working η is less than 20%, the surface hardness Hv after aging is not more than 600, making it impossible to obtain a sufficient hardness. On the contrary, if the percent cold working η is not less than 20%, the surface hardness Hv after aging is not less than 600, making it possible to obtain a bearing material having a sufficient hardness. Further, if the percent cold working η is not less than 30%, a bearing material having a stabilized hardness of not less than 600 can be obtained.

The same disc-shaped specimen as used above (β-titanium alloy, Ti-15V-3Cr-3Sn-3Al) was subjected to solution treatment, water cooling, cold working, etc. in the same manner as mentioned above. The specimen was then subjected to aging under isothermal conditions (450° C.) for 5 to 50 hours. The specimen was then measured for surface hardness Hv. The specimen was also subjected to submerged life test in the same manner as in the first group of examples.

Table 6 shows the results of measurement of hardness Hv and submerged life $L_{10}$ vs. percent cold working $\eta$.

TABLE 6

| Example No. | Percent Cold Working $\eta$ (%) | Aging Time (hr) | Hardness (Hv) | Submerged Life $L_{10}$ (× $10^6$ cycle) |
|---|---|---|---|---|
| Example 41 | 25 | 5 | 618 | 16.8 |
| Example 42 | 30 | 5 | 623 | 17.1 |
| Example 43 | 50 | 5 | 629 | 17.1 |
| Example 44 | 80 | 5 | 631 | 18.9 |
| Example 45 | 25 | 7 | 620 | 17.3 |
| Example 46 | 30 | 7 | 622 | 18.5 |
| Example 47 | 50 | 7 | 631 | 19.7 |
| Example 48 | 80 | 7 | 638 | 20.1 |
| Comparative Example 141 | 25 | 50 | 583 | 4.2 |
| Comparative Example 142 | 30 | 50 | 585 | 4.4 |
| Comparative Example 143 | 50 | 50 | 590 | 4.5 |
| Comparative Example 144 | 80 | 50 | 597 | 4.8 |
| Comparative Example 145 | 0 | 5 | 424 | 1.2 |
| Comparative Example 146 | 0 | 7 | 455 | 1.6 |
| Comparative Example 147 | 0 | 10 | 451 | 1.4 |
| Comparative Example 148 | 0 | 50 | 448 | 1.4 |
| Comparative Example 149 | 15 | 5 | 568 | 4.3 |
| Comparative Example 150 | 15 | 7 | 572 | 5.0 |
| Comparative Example 151 | 15 | 10 | 572 | 5.1 |

As can be seen in Table 6, in Comparative Examples 141 to 144, cold working was effected at a percent working $\eta$ of from 25 to 80%. In other words, cold working was effected at a percent working $\eta$ of not less than 20%. However, since aging was effected for period of time as long as 50 hours, the bearing materials were softened and thus exhibited a reduced surface hardness Hv and submerged life $L_{10}$. This is probably because the aging time T is too long, giving overaging that causes hard $\alpha$ phase to grow coarsely or $\alpha$ phase to be deposited at grain boundary and hence causing a hardness drop. In Comparative Examples 145 to 151, cold working was effected at a percent working $\eta$ of not more than 20%, making it impossible to obtain satisfactory results for use in special corrosive atmospheres concerning hardness Hv and submerged life $L_{10}$. This is probably because if the percent cold working $\eta$ is low, dislocation is nonuniformly introduced, making it difficult for $\alpha$ phase to be uniformly and finely deposited in $\beta$ crystalline grins. Thus, the resulting degree of reinforcement is small. Further, $\alpha$ phase is preferentially deposited at grain boundary to reduce the grain boundary strength, causing early flaking. On the contrary, in Examples 41 to 48, the percent cold working $\eta$ is not less than 20%, and the aging time T is as short as 5 to 7 hours, making it possible to obtain a hardness Hv of not less than 600 and hence a sufficient submerged life $L_{10}$. The inventors measured the relationship between percent cold working $\eta$ and aging time T (hr) required until the highest hardness is reached. Table 7 shows the measurements.

TABLE 7

| Example No. | Percent Cold working $\eta$ (%) | Aging Time (hr) Required Until Highest Hardness is Reached |
|---|---|---|
| Example 51 | 25 | 5 |
| Example 52 | 30 | 5 |
| Example 53 | 50 | 4 |
| Example 54 | 70 | 4 |
| Comparative Example 161 | 0 | 7 |
| Comparative Example 162 | 15 | 6 |

As can be seen in Table 7, in Comparative Example 161, no cold working is effected, requiring 7 hours of aging time T until the highest hardness is reached. In Comparative Example 162, the percent cold working $\eta$ is as low as 15%, requiring 6 hours of aging time T. On the contrary, in Examples 51 to 54, the percent cold working $\eta$ is not less than 20%, requiring aging time T as short as 4 to 5 hours. Thus, a great effect of accelerating the deposition of $\alpha$ phase in $\beta$ crystalline grains can be exerted.

FIFTH GROUP OF EXAMPLES

The inventors examined a bearing material which had been subjected to shot peening after cold working and a bearing material which had not been subjected to shot peening after cold working for the relationship between percent cold working $\eta$ and surface hardness after aging.

In some detail, Ti-15Mo-5Zr as $\beta$ type titanium alloy was subjected to solution treatment at a temperature of 750° C. in an Ar atmosphere, water-cooled to form a residual $\beta$ single phase texture, subjected to cold rolling (cold working) at a predetermined percent working $\eta$, subjected to shot peening using a straight-hydraulic air blast machine, and then subjected to aging at a temperature of 475° C. for 5 hours to prepare a specimen. Separately, a specimen was prepared in the same manner as mentioned above except that the titanium alloy was not subjected to shot peening after cold working. The cold working was effected at a percent working $\eta$ of 0%, 5%, 10%, 15%, 20%, 30%, and 50%, respectively.

The shot peening conditions will be described below.

Shot Peening Conditions

Shot: Shot intensity 6A
Shooting material: Cast steel
  Grain diameter: 400 μm
  Surface hardness Hv: 420

These specimens were each measured for surface hardness Hv by means of a Vickers hardness tester.

Figure 7:
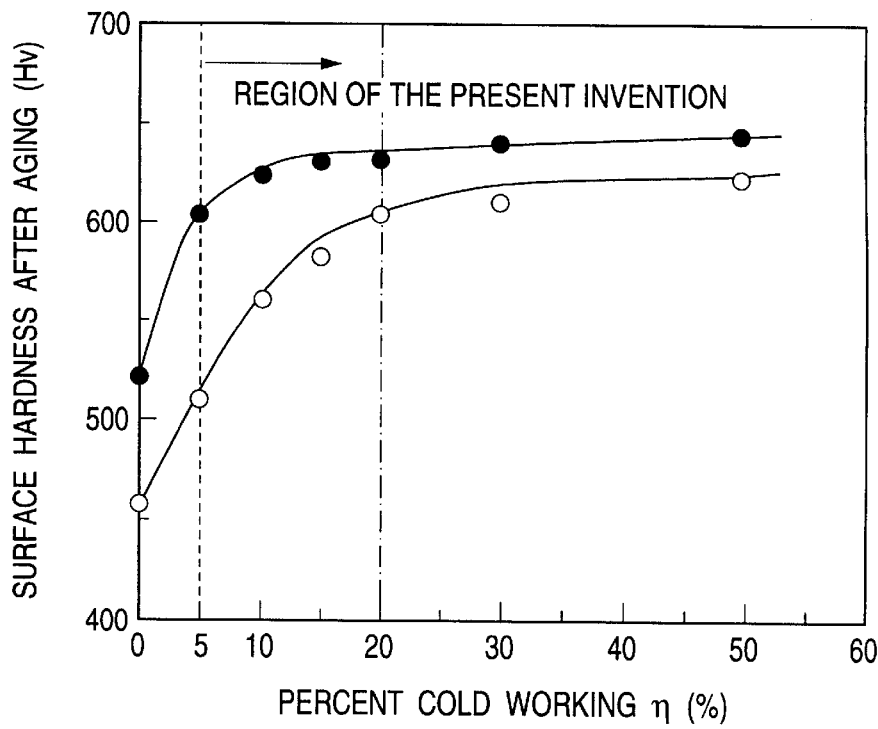
FIG. 7 is a characteristic curve illustrating the relationship between percent cold working η and hardness Hv after aging in the fifth group of examples.

FIG. 7 shows a characteristic curve illustrating the relationship between percent cold working $\eta$ and surface hardness Hv after aging in the present examples, wherein ● indicates the case where shot peening is effected after cold working, and 0 indicates the case where only cold working is effected.

As can be seen in FIG. 7, cold working, if not followed by shot peening, must be effected at a percent working $\eta$ of not less than 20% to obtain a bearing material having a surface hardness Hv of not less than 600. On the contrary, cold working, if followed by shot peening, may be effected even at a percent working $\eta$ as low as 5% to obtain a bearing material having a surface hardness Hv of not less than 600. Further, if the percent cold working $\eta$ is low, the bearing material can be prevented from hardening to the core, making it possible to obtain a good toughness.

The inventors prepared specimens from Ti-15Mo-5Zr as $\beta$ type titanium alloy. These specimens were subjected to solution treatment, water cooling, cold rolling, shot peening and aging. These specimens were then measured for surface hardness Hv and residual compression stress. These specimens were also subjected to submerged life test. For comparison, specimens which had not been subjected to shot peening or cold working were prepared and subjected to the same tests as mentioned above.

For the measurement of residual compression stress, an X-ray residual stress meter was used. The measurement conditions will be described hereinafter.

Conditions for the Measurement of Residual Compression Stress

Target: Cu-Kα
Filter: Ni
Tube voltage: 40 kV
Tube current: 300 mA

For the submerged life test, the same testing machine (see FIG. 4) as used in the first group of examples was used. The test was effected in the same manner as in the first group of examples. However, when the specimens were subjected to shot peening, the race showed a raised surface roughness. In order to eliminate the effect of this surface roughness, the surface of these specimens was polished before the submerged life test.

Table 8 shows the measurements of various specimens which had been subjected to cold working at different percent working η.

shot peening is effected after aging as well, providing a residual compression stress. However, since a bearing material which has been subjected to solution treatment followed by cold working at a low percent working is not subjected to shot peening before aging as in Comparative Example 174, a surface hardness Hv required for bearing cannot be obtained.

On the contrary, in Examples 61 to 70, cold working is effected at a percent working η of from 5 to 30% before shot peening. Thus, the resulting specimen exhibits a surface hardness Hv of not less than 600 and shows a drastic enhancement of submerged life $L_{10}$ as compared with Comparative Examples 171 to 175.

In particular, Examples 66 to 70 involve another shot peening after aging. Thus, the resulting specimens exhibit a further rise in surface hardness Hv if the percent cold working η remains the same. Further, the bearing material can be provided with a residual compression stress. As a result, the submerged life $L_{10}$ can be enhanced.

TABLE 8

| Example No. | Production Conditions | | | | Surface Hardness (Hv) | Residual Compression Stress (kg/cm$^2$) | Submerged Life $L_{10}$ (× 10$^6$ cycle) |
|---|---|---|---|---|---|---|---|
| | % Cold Working | Shot Peening | Aging Conditions | Shot Peening | | | |
| Example 61 | 5 | Yes | 475° C./5 hr | No | 603 | 0 | 17.1 |
| Example 62 | 10 | Yes | " | No | 625 | −2 | 17.3 |
| Example 63 | 15 | Yes | " | No | 632 | −1 | 17.7 |
| Example 64 | 25 | Yes | " | No | 640 | 0 | 18.6 |
| Example 65 | 30 | Yes | " | NO | 644 | 0 | 19.5 |
| Example 66 | 5 | Yes | " | Yes | 631 | −34 | 19.7 |
| Example 67 | 10 | Yes | " | Yes | 639 | −31 | 20.1 |
| Example 68 | 15 | Yes | " | Yes | 644 | −37 | 20.6 |
| Example 69 | 25 | Yes | " | Yes | 649 | −37 | 21.3 |
| Example 70 | 30 | Yes | " | Yes | 651 | −35 | 21.5 |
| Comparative Example 171 | 0 | No | " | No | 458 | 0 | 1.6 |
| Comparative Example 172 | 0 | Yes | " | No | 521 | −2 | 2.2 |
| Comparative Example 173 | 0 | Yes | " | Yes | 521 | −3.0 | 4.3 |
| Comparative Example 174 | 5 | No | " | No | 508 | 0 | 4.6 |
| Comparative Example 175 | 5 | NO | " | Yes | 532 | −29 | 4.8 |

As can be seen in Table 8, in Comparative Example 171, the bearing material is subjected to neither cold working nor shot peening but aging after solution treatment. Thus, the resulting specimen exhibits a low surface hardness Hv and a reduced submerged life $L_{10}$.

In Comparative Example 172, shot peening is effected, causing α phase to be uniformly and finely deposited in the surface layer. Thus, the rise in the surface hardness Hv can be recognized as compared with Comparative Example 171. However, since solution treatment is not followed by cold working but by shot peening, the resulting specimen exhibits a surface hardness Hv of not more than 600, making it impossible to provide a surface hardness Hv required for bearing. In Comparative Example 173, shot peening is effected after aging as well in addition to the conditions used in Comparative Example 172, providing a residual compression stress. However, since no cold working is effected as in Comparative Example 172, a surface hardness Hv required for bearing cannot be obtained.

In Comparative Example 174, cold working is effected at a percent working η as low as 5%. However, since no shot peening is effected, a surface hardness Hv required for bearing cannot be obtained. In Comparative Example 175, In Examples 64, 65, 69 and 70, the percent cold working η is predetermined to not less than 20%. It is thus likely that the bearing material can be hardened to the core to exhibit a reduced toughness. However, a surface hardness Hv of not less than 600 can be obtained, and the submerged life $L_{10}$ cannot be reduced. Accordingly, if the rolling bearing is used in positions requiring toughness, it is preferred that a bearing material which has been subjected to cold working at a percent working η of from 5 to 20% followed by shot peening be used. If the rolling bearing is used in positions where emphasis is placed on surface hardness rather than toughness, it is preferred that the bearing material be subjected to cold working at a percent working η of not less than 20% and then directly to aging without shot peening as in the fourth group of examples. If it is desired to enhance fatigue strength in particular, it is preferred that the bearing material which has been thus aged be subjected to shot peening to have a residual compression stress applied thereto.

SIXTH GROUP OF EXAMPLES

The inventors examined the relationship between aging time T and residual β phase content and surface hardness Hv and the relationship between residual β phase content and bearing life when the lubricant is contaminated by foreign matters.

In some detail, Ti-15V-3Cr-3Sn-3Al as β type titanium alloy was subjected to solution treatment at a temperature of 800° C. in an Ar atmosphere, water-cooled to form a residual β single phase, subjected to cold rolling at a percent working η of 50%, and then subjected to aging at a temperature of 450° C. for various periods of time to prepare various specimens composed of (α+β) texture. These specimens were then determined for residual β phase content and measured for surface hardness Hv.

Firstly, the specimen was subjected to chemical polishing with an aqueous solution comprising 60% hydrogen peroxide and 10% hydrofluoric acid so that α processed layer formed on the surface thereof was removed to a depth of about 50 μm. Subsequently, using an X-ray diffractometer, the volumetric ratio (vol %) of residual β phase was calculated with Co-Kα line as a target. As the X-ray diffractometer there was used Type RAD-III X-ray diffractometer Geiger Flex (produced by Rigaku Corp.).

For the measurement of surface hardness Hv, a Vickers hardness testing machine was used as in the fourth and fifth groups of examples.

Figure 8:
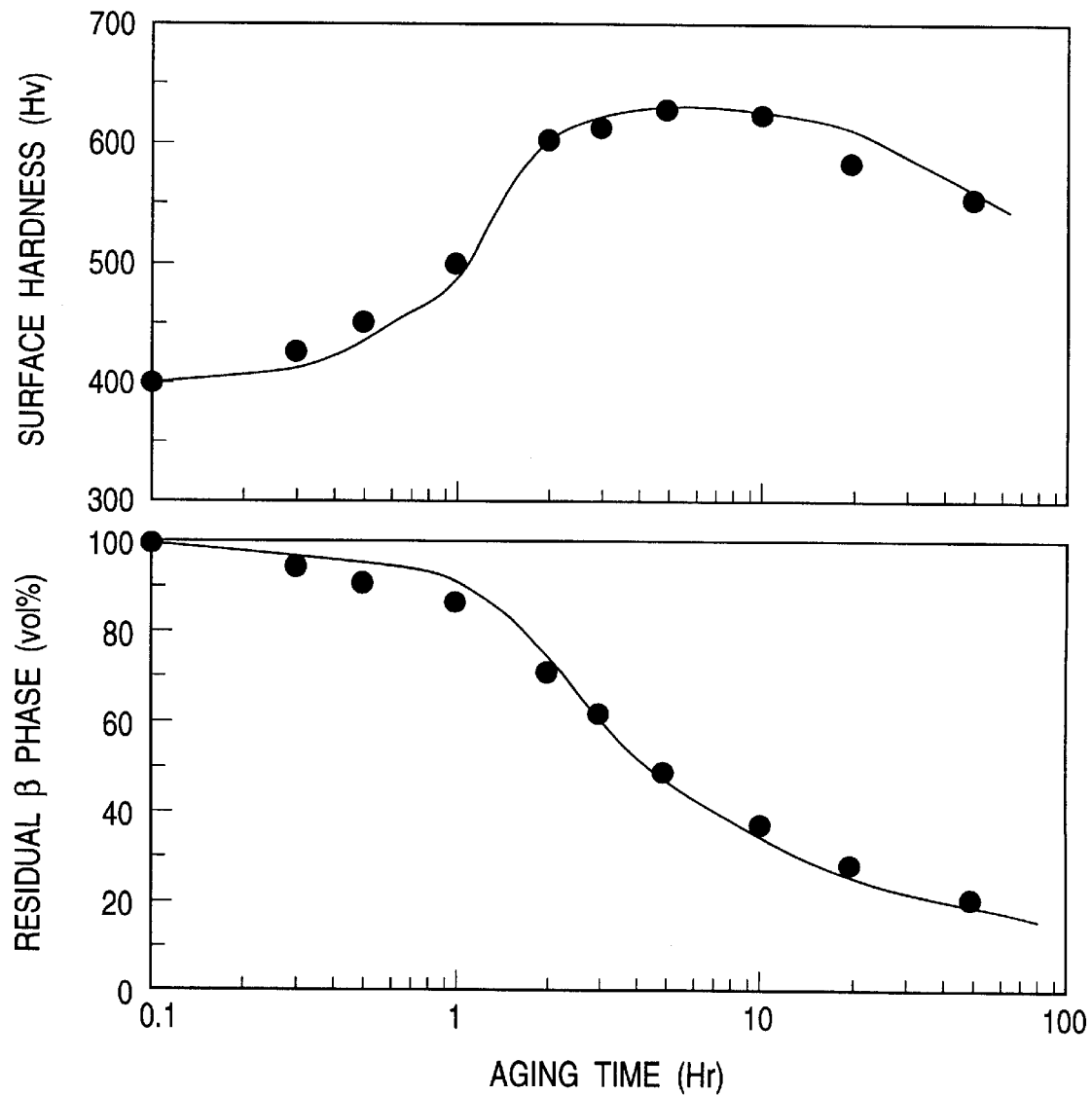
FIG. 8 is a characteristic curve illustrating the relationship between aging time and residual β phase content and hardness Hv after aging in the sixth group of examples.

FIG. 8 is a characteristic curve illustrating the relationship between aging time T and residual β phase content and surface hardness Hv.

As can be seen in FIG. 8, concerning the relationship between aging time T and surface hardness Hv, as the aging time T increases, the deposition of α phase proceeds to reduce the residual β phase content. In particular, when the aging time T exceeds 1 hour, the volumetric ratio of residual β phase shows a sudden drop.

On the other hand, concerning the relationship between aging time T and surface hardness Hv, when the aging time T exceeds 1 hour, and the deposition of α phase becomes remarkable, the rise in surface hardness Hv becomes remarkable. However, when the aging time T exceeds 10 hours, the content of α phase shows a continuous rise, and the volumetric ratio of residual β phase continues to drop. Thus, the surface hardness Hv shows a continuous drop. Accordingly, if aging is effected for 10 hours or longer, overaging occurs.

The inventors conducted submerged life test on rolling bearings containing residual β phase which had been aged for different periods of time shown in FIG. 8 using a submerged thrust bearing life testing machine shown in FIG. 4.

The conditions for submerged life test will be described hereinafter.

Test Conditions

Bearing tested: Thrust ball bearing (Designation No. 51305)

Rotary speed of rotary axis: 1,000 rpm

Test load: 150 kgf

Material of rolling elements: $Si_3N_4$

Material of cage: Fluororesin

Foreign matters: $Fe_3C$ powder (300 ppm in water)

Grain diameter of foreign matters: 74–147 μm

Surface hardness HRC of foreign matters: 52

The inner race and outer race in each bearing to be used in the submerged life test were prepared from the same material, which is indicated in Table 9.

The submerged life $L_{10}$ indicates the time at which 10% of the specimens undergo cracking or flaking which can be observed under microscope or visually. The submerged life is quantitatively evaluated by the number of rotations cumulated until this point is reached.

Figure 9:
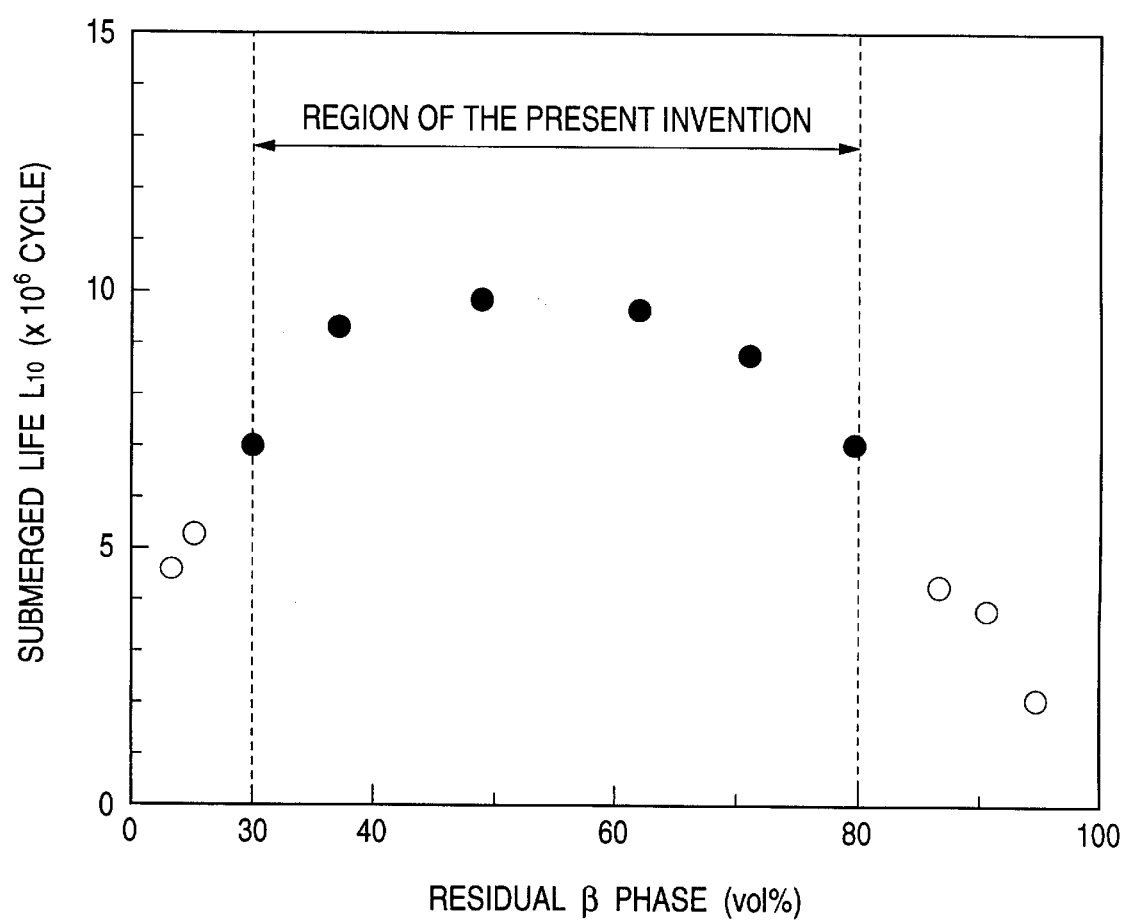
FIG. 9 is a characteristic curve illustrating the relationship between residual β phase and submerged life $L_{10}$ in the sixth group of examples, wherein the reference numeral 3 indicates an inner race, the reference numeral 4 indicates an outer race, the reference numeral 5 indicates rolling elements, the reference numeral 12 indicates a outer race, the reference numeral 13 indicates an inner race, and the reference numeral 14 indicates rolling elements.

FIG. 9 is a characteristic curve illustrating the relationship between the residual β phase content and the submerged life $L_{10}$ of the specimens which have been aged for different periods of time as shown in FIG. 8.

As can be seen in FIG. 9, if the volumetric ratio of residual β phase falls below 30 vol %, the submerged life $L_{10}$ is extremely low, although the content of hard α phase is greater than that of residual β phase. This is because the specimen are overaged. Thus, α phase grows coarsely or is deposited at β phase grain boundary to cause rapid softening. Therefore, the resulting bearing exhibits an insufficient hardness. Further, since there is a small residual β phase content, the impressions possibly formed by foreign matters exert a small effect of relaxing stress. On the other hand, when the bearing material which has been subjected to solution treatment is rapidly cooled, a residual β single phase is formed. Therefore, if the volumetric ratio of residual β phase exceeds 80 vol %, this state corresponds to that obtained at the initial stage of aging. Thus, the specimen is not sufficiently hardened. Accordingly, a sufficient surface hardness Hv cannot be obtained. The submerged life $L_{10}$ is extremely reduced.

On the contrary, if the volumetric ratio of residual β phase falls within the range of from 30 to 80 vol %, the residual β phase relaxes stress on the impressions formed by foreign matters even when the lubricant is contaminated by foreign matters. Further, α phase is deposited to an ideal extent, making it possible to provide a surface hardness Hv of not less than 600 and a stabilized prolonged submerged life $L_{10}$.

The inventors prepared various specimens from Ti-15Mo-5Zr as β type titanium alloy and Ti-6Al-4V as (α+β) type titanium alloy. These titanium alloys were subjected to heat treatment (solution treatment and aging) under different conditions or cold working at different percent working η. These specimens were measured for volumetric ratio (vol %) of residual β phase, surface hardness Hv and submerged life $L_{10}$ under the same conditions as mentioned above (lubricant contaminated by foreign matters).

Table 9 shows the production conditions of these β type titanium alloys and the measurements of the various specimens.

TABLE 9

| Example No. | Alloy | Solution Treatment Temp. (° C.) | % Cold Working | Aging Temp. (° C.) | Aging Time (hr) | Surface Hardness (Hv) | Residual β phase (vol-%) | Submerged life $L_{10}$ (×10⁶ cycle) |
|---|---|---|---|---|---|---|---|---|
| Example 71 | Ti-15 Mo-5 Zr (β type) | 750° C. water | 50 | 475 | 3 | 615 | 75 | 9.3 |

TABLE 9-continued

| Example No. | Alloy | Solution Treatment Temp. (° C.) | % Cold Working | Aging Temp. (° C.) | Aging Time (hr) | Surface Hardness (Hv) | Residual β phase (vol-%) | Submerged life $L_{10}$ (×10$^6$ cycle) |
|---|---|---|---|---|---|---|---|---|
| Example 72 | Ti-15 Mo-5 Zr (β type titanium) | 750° C. water cooling | 50 | 475 | 5 | 625 | 59 | 10.1 |
| Example 73 | Ti-15 Mo-5 Zr (β type titanium) | 750° C. water cooling | 50 | 475 | 7 | 630 | 51 | 10.4 |
| Example 74 | Ti-15 Mo-5 Zr (β type titanium) | 750° C. water cooling | 50 | 475 | 10 | 621 | 45 | 9.8 |
| Example 75 | Ti-15 Mo-5 Zr (β type titanium) | 750° C. water cooling | 30 | 475 | 3 | 608 | 78 | 8.9 |
| Example 76 | Ti-15 Mo-5 Zr (β type titanium) | 750° C. water cooling | 30 | 475 | 5 | 611 | 70 | 9.2 |
| Example 77 | Ti-15 Mo-5 Zr (β type titanium) | 750° C. water cooling | 30 | 475 | 7 | 615 | 64 | 9.3 |
| Example 78 | Ti-15 Mo-5 Zr (β type titanium) | 750° C. water cooling | 30 | 475 | 10 | 609 | 58 | 9.5 |
| Comparative Example 181 | Ti-15 Mo-5 Zr (β type titanium) | 750° C. water cooling | 50 | 400 | 5 | 658 | — | 1.3 |
| Comparative Example 182 | Ti-15 Mo-5 Zr (β type titanium) | 750° C. water cooling | 50 | 400 | 7 | 666 | — | 1.4 |
| Comparative Example 183 | Ti-15 Mo-5 Zr (β type titanium) | 750° C. water cooling | 50 | 550 | 5 | 573 | 50 | 3.5 |
| Comparative Example 184 | Ti-15 Mo-5 Zr (β type titanium) | 750° C. water cooling | 50 | 550 | 7 | 561 | 45 | 2.8 |
| Comparative Example 185 | Ti-6 Al-4V ((α + β) type titanium) | 950° C. water cooling | 0 | 540 | 4 | 421 | 58 | 0.8 |
| Comparative Example 186 | Ti-6 Al-4V ((α + β) type titanium) | 900° C. water cooling | 0 | 540 | 4 | 423 | 43 | 0.9 |

As can be seen in Table 9, Comparative Examples 181 and 182 provide a surface hardness Hv of not less than 600 but an extremely short submerged life $L_{10}$. In Comparative Examples 181 and 182, the surface hardness itself is raised. However, since the aging temperature is as low as 400° C., ω phase is formed, reducing the plastic deformability. Thus, the concentration of stress on the edge of impressions formed by foreign matters is raised, causing early flaking.

In Comparative Examples 181 and 182, the residual β phase content was not calculated. This is because the deposition of ω phase makes it impossible to accurately determine the residual β phase content. However, since ω phase is extremely brittle, it has an adverse effect on the texture even if the volumetric ratio of residual β phase falls within the range of from 30 to 80 vol %. Accordingly, the condition for aging so that ω phase is deposited even in a slight amount should be avoided.

In Comparative Examples 183 and 184, the aging temperature is predetermined too high as 550° C. Thus, α phase which would be deposited in layer at residual β phase grain boundary or inside β phase grain boundary grows coarsely, making it impossible to undergo sufficient aged hardening.

In Comparative Examples 185 and 186, (α+β) type titanium alloy is used as titanium alloy. When subjected to solution treatment followed by rapid cooling, an (α+β) type titanium alloy forms a martensite texture of a (α+β) two-phase texture which cannot be subjected to cold working. Accordingly, since this titanium alloy cannot be subjected to cold working, it exhibits a reduced surface hardness Hv and an extremely reduced submerged life $L_{10}$ even when subsequently aged.

On the contrary, in Examples 71 to 78, the aging temperature is predetermined to 475° C., which is the optimum aging temperature for the present alloy, the aging time is predetermined to a range of from 3 to 10 hours, and the residual β phase content is varied. All these examples exhibit a surface hardness Hv of not less than 600 and provide a remarkable improvement of submerged life $L_{10}$ as compared with the comparative examples. Thus, these examples can provide rolling bearings suitable for use in the conditions where corrosion resistance is required and foreign matters are incorporated.

As mentioned above, the rolling bearing according to the present invention comprises an outer race and an inner race and rolling elements which are provided between the outer race and the inner race such that the rolling elements rotate freely, characterized in that at least the inner race is made of a titanium alloy and the rolling elements are made of ceramics. Thus, the rolling bearing according to the present invention exhibits a drastically improved corrosion resistance as compared with the case where the race is made of a steel material such as stainless steel and thus is suitable for use in corrosive atmospheres such as food machine, semiconductor producing machine and chemical fiber producing machine which must be resistant to corrosion with sea water or chemical.

Further, the use of a titanium alloy having a small linear expansion coefficient and a small density as an inner race material makes it possible to inhibit the rise in the temperature of the outer race during high speed rotation and hence provides a rolling bearing suitable for use in machine tools which operate at a high rotary speed.

Moreover, in accordance with the present invention, the rise in the production cost can be inhibited as compared with the case where the bearing is totally made of ceramics.

Further, by forming at least one of the inner race and outer race by a β type titanium alloy and predetermining the percent cold working η to not less than 20%, α phase is deposited in β crystalline grains to enhance hardness and bearing strength, making it possible to improve the durability of the bearing.

Moreover, by predetermining the percent cold working η of β 3 type titanium alloy to a range of from 5 to 20% and subjecting the β type titanium alloy thus cold-worked to shot peening, α phase is finely deposited, enabling drastic rise in the hardness of the surface layer alone without impairing the toughness. Further, by subjecting the β type titanium alloy to shot peening after aging as well, the β type titanium alloy can be provided with a residual compression stress, making it possible to improve the bearing life in a special atmosphere.

Further, by predetermining the volumetric ratio of residual β phase in the foregoing β type titanium alloy to a range of from 30 to 80%, the concentration of stress on the edge of impressions formed on the surface of the race can be relaxed even when the lubricant is contaminated by foreign matters, making it possible to provide a rolling bearing which exhibits an excellent corrosion resistance and a prolonged life even when the lubricant is contaminated by foreign matters.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising races composed of an outer race and an inner race and rolling elements which are provided between the outer race and the inner race such that the rolling elements rotate freely, wherein at least said inner race is made of a titanium alloy and said rolling elements are corrosion resistant, wherein said titanium alloy is selected from the group consisting of a β type titanium alloy and an (α+β) type titanium alloy and said rolling elements are made of a material selected from the group consisting of ceramics and martensite stainless steel.

2. The rolling bearing of claim 1, wherein the surface hardness (Hv) of the finished raceway track on at least one race selected from the group consisting of said outer race and said inner race is not less than 600.

3. A rolling bearing comprising races composed of an outer race and an inner race and rolling elements which are provided between the outer race and the inner race such that the rolling elements rotate freely, wherein at least said inner race is made of a titanium alloy, and wherein a surface of a finished raceway track on at least one race selected from the group consisting of said outer race and said inner race comprises a mixture of α phase texture and β phase texture, the proportion of said β phase in said mixture being from 30 to 80 vol %.

4. The rolling bearing of claim 3, wherein the surface hardness (Hv) of the finished raceway track on at least one race selected from the group consisting of said outer race and said inner race is not less than 600.

* * * * *